(12) United States Patent
Park

(10) Patent No.: US 12,025,502 B2
(45) Date of Patent: Jul. 2, 2024

(54) SPECTROSCOPIC POLARIMETER AND DEVICE FOR AUTOMATICALLY ADJUSTING OPTICAL PATH DIFFERENCE

(71) Applicant: MGEN.CO,.LTD, Suwon-si (KR)

(72) Inventor: Min Young Park, Yongin-si (KR)

(73) Assignee: MGEN.CO., LTD, Suwon-si (KR)

( * ) Notice: Subject to any disclaimer, the term of this patent is extended or adjusted under 35 U.S.C. 154(b) by 245 days.

(21) Appl. No.: 17/729,082

(22) Filed: Apr. 26, 2022

(65) Prior Publication Data
US 2022/0252459 A1  Aug. 11, 2022

Related U.S. Application Data

(63) Continuation of application No. PCT/KR2020/004620, filed on Apr. 6, 2020.

(30) Foreign Application Priority Data

Oct. 31, 2019 (KR) .................. 10-2019-0137776

(51) Int. Cl.
*G01J 9/02* (2006.01)
*G01J 9/00* (2006.01)
(Continued)

(52) U.S. Cl.
CPC .............. *G01J 9/02* (2013.01); *G02B 7/182* (2013.01); *G02B 27/283* (2013.01); *G01J 2009/006* (2013.01); *G01J 2009/0261* (2013.01)

(58) Field of Classification Search
CPC ............ G01J 9/02; G01J 2009/006; G01J 2009/0261; G01J 3/0224; G01J 3/0256;
(Continued)

(56) References Cited

U.S. PATENT DOCUMENTS

2006/0164643 A1* 7/2006 Giakos .................. G01J 3/433
356/369
2009/0009759 A1  1/2009 Backman et al.
(Continued)

FOREIGN PATENT DOCUMENTS

CN  110095418 A  8/2019
JP  S57-142242 A  9/1982
(Continued)

OTHER PUBLICATIONS

English Translation of Park et al KR1937894B1 Description (Year: 2019).*
(Continued)

*Primary Examiner* — Dominic J Bologna
*Assistant Examiner* — Akbar H. Rizvi
(74) *Attorney, Agent, or Firm* — Studebaker & Brackett PC

(57) ABSTRACT

A spectropolarimetric apparatus according to an embodiment of the present invention includes a light source attachment/detachment unit to which a light source is detachably coupled, a polarization interferometer configured to split light emitted from the light source coupled to the light source attachment/detachment unit into a plurality of polarized light beams using a polarization beam splitter and irradiate at least some of the split polarized light beams to a reflective sample to output the reflected light, and a spectrometer configured to measure physical properties of the reflective sample by analyzing the output light, wherein a wavelength of the light source coupled to the light source attachment/detachment unit varies depending on the reflective sample.

6 Claims, 24 Drawing Sheets

(51) Int. Cl.
*G02B 7/182* (2021.01)
*G02B 27/28* (2006.01)

(58) Field of Classification Search
CPC ........ G01J 3/0291; G01J 3/447; G01J 3/4535; G01J 4/04; G02B 7/182; G02B 27/283; G02B 27/28; G01N 21/21; G01N 21/01
See application file for complete search history.

(56) References Cited

U.S. PATENT DOCUMENTS

| | | | |
|---|---|---|---|
| 2016/0066775 | A1 | 3/2016 | Hunter et al. |
| 2017/0227521 | A1* | 8/2017 | Cafferty ................ G01J 3/0291 |
| 2018/0135970 | A1* | 5/2018 | Mazumdar ............ G01J 3/2823 |

FOREIGN PATENT DOCUMENTS

| | | | | |
|---|---|---|---|---|
| JP | H08-293234 | A | | 11/1996 |
| JP | H11-327416 | A | | 11/1999 |
| JP | 2004-347399 | A | | 12/2004 |
| JP | 2010-223871 | A | | 10/2010 |
| JP | 2012-253815 | A | | 12/2012 |
| JP | 2015-158384 | A | | 9/2015 |
| KR | 10-2017-0092803 | A | | 8/2017 |
| KR | 10-2018-0123023 | A | | 11/2018 |
| KR | 10-1937894 | B1 | | 1/2019 |
| KR | 1937894 | B1 | * | 1/2019 ............. G01B 11/06 |
| KR | 10-2015216 | B1 | | 8/2019 |
| WO | 2005/029015 | A2 | | 3/2005 |
| WO | WO-2007033433 | A1 | * | 3/2007 ............ G01J 3/2823 |

OTHER PUBLICATIONS

The partial supplementary European search report (R. 164 EPC) issued by the European Patent Office on Nov. 11, 2022, which corresponds to European Patent Application No. 20881005.1-1020 and is related to U.S. Appl. No. 17/729,082.
An Office Action; "Notice of Reasons for Refusal," mailed by the Japanese Patent Office on Sep. 6, 2022, which corresponds to Japanese Patent Application No. 2021-571559 and is related to U.S. Appl. No. 17/729,082.
Decision of Dismissal of Amendment and Decision of Refusal mailed by the Japanese Patent Office on May 23, 2023, which corresponds to Japanese Patent Application No. 2021-571559 and is related to U.S. Appl. No. 17/729,082.
An Office Action; "Notice of Reasons for Refusal," mailed by the Japanese Patent Office on Dec. 13, 2022, which corresponds to Japanese Patent Application No. 2021-571559 and is related to U.S. Appl. No. 17/729,082; with English language translation.
International Search Report issued in PCT/KR2020/004620; mailed Jul. 28, 2020.

* cited by examiner

1400

SPECTROSCOPIC POLARIMETER AND DEVICE FOR AUTOMATICALLY ADJUSTING OPTICAL PATH DIFFERENCE

CROSS-REFERENCE TO RELATED APPLICATION

This application is a Continuation of International Application No. PCT/KR2020/004620 filed Apr. 6, 2020, which claims benefit of priority to Korean Patent Application No. 10-2019-0137776 filed Oct. 31, 2019 the entire content of which is incorporated herein by reference

TECHNICAL FIELD

The present invention relates to a spectropolarimetric apparatus that measures a sample to be measured using light that passes through and/or is reflected by the sample.

BACKGROUND ART

Spectropolarimetry is regarded as one of the most accurate and expected solutions applicable to various fields. In order to combine polarization measurement techniques through such an interferometer, numerous studies, such as, spectral domain polarization-sensitive optical coherence tomography (SD PS-OCT), real-time high-sensitivity surface-plasmon resonance (SPR) bio-sensing, and circular dichroism (CD) measurement have been conducted. In addition, a spectral approach that combines a birefringent crystal or a dual spectral sensing module with the interferometer in order to derive a Stokes vector from measurement values of a spectroscopic ellipsometer, and to replace a spectral interferometer and a scanning method, is also known. Recently, a snapshot-type polarization interferometer has been proposed, and thus, the measurement may not only be robust against disturbances due to external vibration and the like, but also may be performed quickly and stably.

The use of such a polarization interferometer enables rapid and stable measurement on the basis of a snapshot. However, a conventional spectropolarimetric apparatus using the polarization interferometer is implemented as an expensive large-sized product, and because measurements are performed on the loaded sample one by one, it is difficult to measure quickly while moving a plurality of points in a single sample or a plurality of samples. In particular, there is a fundamental limitation in measuring a continuous sample used in a roll-to-roll process.

Further, generally, the spectropolarimetric apparatus performs measurement on various samples using white light, and in order to use the white light, components for forming a chopper, spectral light, or collimated light are required, and a certain amount of time is required until the apparatus is initially stabilized for performing the measurement on the sample. In addition, since the white light has a broad range of wavelengths, it is difficult to quickly measure a sample because even the range of wavelengths unnecessary for sample measuring are analyzed. Accordingly, it is necessary to develop a spectropolarimetric apparatus capable of quickly and accurately measuring a sample by using light suitable for the characteristics of the sample other than white light.

DISCLOSURE

Technical Problem

The present invention is directed to providing a spectropolarimetric system including a spectropolarimetric apparatus capable of performing rapid and continuous measurement and a cradle capable of mounting the same thereon.

The present invention is also directed to providing a spectropolarimetric apparatus in which a light source, a spectrometer, and a polarization interferometer are miniaturized and packaged, and also easily attached and detached to and from each other and easily maintained.

The present invention is also directed to providing an apparatus capable of measuring a sample quickly and accurately by being formed to enable replacing the light source with a light source having a wavelength suitable for measurement for each sample.

It should be noted that technical objects of the present disclosure are not limited to the above-described objects, and other objects of the present disclosure will be apparent to those skilled in the art from the following descriptions.

Technical Solution

A spectropolarimetric apparatus according to an embodiment of the present invention includes a light source attachment/detachment unit to which a light source is detachably coupled, a polarization interferometer configured to split light emitted from the light source coupled to the light source attachment/detachment unit into a plurality of polarized light beams using a polarization beam splitter and irradiate at least some of the split polarized light beams to a reflective sample to output the reflected light, and a spectrometer configured to measure physical properties of the reflective sample by analyzing the output light, wherein a wavelength of the light source coupled to the light source attachment/detachment unit varies depending on the reflective sample.

Advantageous Effects

According to a spectropolarimetric apparatus and a spectropolarimetric system of the present invention, different positions of a single sample or different samples can be measured continuously while rapidly measuring the sample on the basis of a snapshot.

Further, a spectropolarimetric apparatus according to the present invention can be miniaturized and packaged so that portability and mobility can be enhanced, and a light source, a spectrometer, and a polarization interferometer can be easily attached and detached to and from each other and easily maintained because a connection can be established therebetween by being simply coupled to each other.

Further, according to a spectropolarimetric apparatus of the present invention, physical properties of a target sample can be obtained more accurately since a light source can be replaced with a light source having a wavelength suitable for sample measurement according to the characteristics of the sample, and the target sample can be measured quickly by using straight light in the form of a pulse.

MODES OF THE INVENTION

Figure 1:
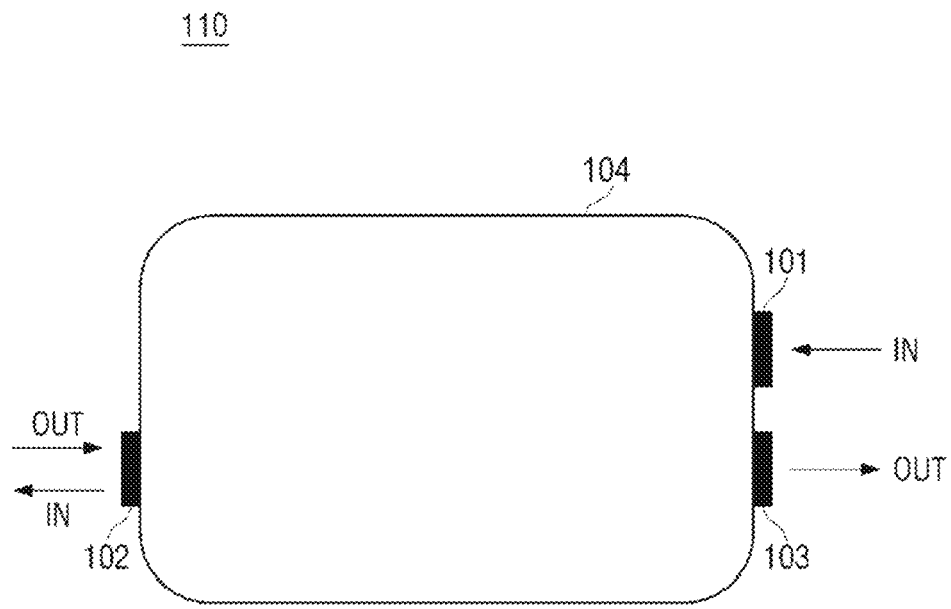
FIG. 1 is a conceptual diagram of a polarization interferometer of a spectropolarimetric apparatus according to one embodiment of the present invention.

FIG. 1 is a conceptual diagram of a polarization interferometer 110 of a spectropolarimetric apparatus according to a first embodiment of the present invention. The polarization interferometer 110 may include a light input terminal 101 to which light emitted from a light source is incident, a measurement terminal 102 through which light is irradiated to a reflective sample from the polarization interferometer 110 and to which the light reflected by the reflective sample is incident, a light output terminal 103 from which light is emitted to a spectrometer from the polarization interferometer 110, and a housing 104 in which three terminals 101, 102, and 103 are mounted. As such, the polarization interferometer 110 is configured with the housing 104 to which a light source or a spectrometer is attachable and detachable, and thus may be modularized and miniaturized.

Figure 2:
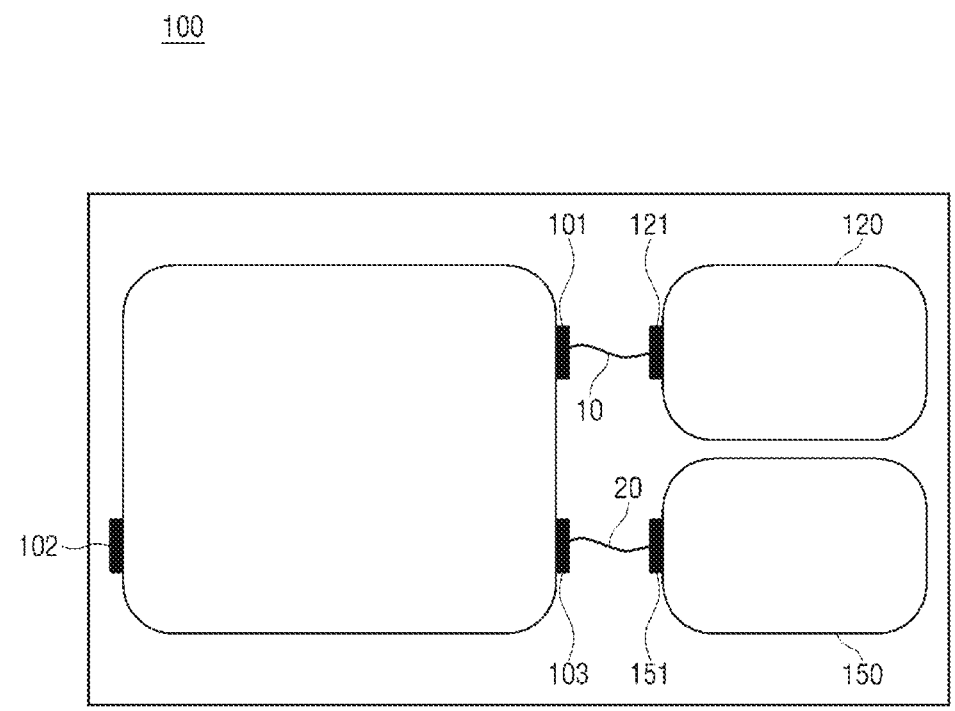
FIG. 2 is a view illustrating a spectropolarimetric apparatus in which a polarization interferometer, a light source, a light source attachment/detachment unit, and a spectrometer are packaged.

As shown in FIG. 2, in a spectropolarimetric apparatus 100 according to the first embodiment of the present invention, a light source 120, the polarization interferometer 110, and a spectrometer 150 may be formed as a package. A signal analyzer (not shown) may be further included. Here, a direct connection may be established, or as a medium for transmitting light, an optical fiber or optical cables 10 and 20 may be connected between a light-source-side terminal 121 of the light source 120 and the light input terminal 101 of the polarization interferometer 110, and between the light output terminal 103 of the polarization interferometer 110 and a light input terminal 151 of the spectrometer 150.

At this point, the polarization interferometer 110 splits the light emitted from the light source 120 into a plurality of polarized light beams using a polarization beam splitter, and irradiates at least some of the split polarized light beams to the reflective sample to output the reflected light. The light output in this way is provided to the spectrometer 150, and the spectrometer 150 analyzes the output light to measure physical properties of the reflective sample.

The light source 120 is detachably coupled to a light source attachment/detachment unit. The light source 120 configured to emit light to the polarization interferometer 110 is not fixed to the spectropolarimetric apparatus 100 and is detachably formed through the light source attachment/detachment unit. Since the light source 120 is detachable, the light source 120 may be easily replaced. Thus, depending on the reflective sample, a light source may be selected and replaced, and various light sources may be selected. The light source 120 and the light source attachment/detachment unit may be attached to or detached from each other by a bolt-nut method or a fitting method, and may be coupled to each other by various other detachable methods.

The light source 120 coupled to the light source attachment/detachment unit has a different wavelength depending on the reflective sample to be measured. For a rapid and accurate measurement, a light source having a wavelength more sensitive to the reflective sample than an existing white light source having a wide wavelength range is used. The light source 120 to be coupled to the light source attachment/ detachment unit may be selected differently according to the characteristics of the reflective sample to be measured. Specifically, a light source having a wavelength at which an interference fringe with respect to the reflective sample is easily generated may be selected. In this case, a wavelength in which a resolution of the interference fringe is greater than or equal to a threshold may be selected. Here, the threshold may be a relative value with other wavelengths and may be an absolute value independent of other wavelengths.

The light source 120 may use a light source that emits straight light. By using the straight light, polarized light may be measured without having components such as a lens for forming a chopper, a spectral light, or a collimated light that is necessary for using a white light source. The straight light is light having straightness rather than diffusivity, and corresponds to a laser, a light-emitting diode (LED), and the like. Accordingly, the light source 120 may be a laser or an LED. The laser is a light source having a constant frequency, that is, a light source that emits light having a constant wavelength, and an interference fringe is easily generated because a coherence length thereof is greater than that of the white light source, and thus the laser is easier to measure than the white light source. The LED is also a light source that emits light with high directivity having a specific wavelength. Of course, in addition to this, the light source 120 for emitting various types of light having straightness may be used.

The light source may be replaced with a white light source as well as a light source having straightness. When the white light source is combined, an optical system for converting white light into collimated light may be combined together. In this case, the combined optical system may include a collimating lens, a linear polarizer, and an iris. The light emitted from the light source is converted into collimated light by the collimating lens and linearly polarized at an angle of 45° by the linear polarizer to improve the contrast of light interference. In addition, the iris may adjust the magnitude of the linearly-polarized light that has passed through the linear polarizer.

A wavelength range in which the reflective sample is sensitive is derived, and then a light source having a wavelength corresponding thereto may be selected, coupled to the light source attachment/detachment unit, and used as a light source for measurement. Here, the light source may have a single wavelength required to measure the reflective sample. By using the light source having a single wavelength that is sensitive to the reflective sample and suitable for measuring the reflective sample, the reflective sample may be measured quickly and accurately. The light source 120 is detachably coupled to the light source attachment/detachment unit, and may be replaced with a light source having a different wavelength according to the reflective sample. Since the light source may be simply replaced, light sources of various wavelength ranges may be selected and used easily by a user. Alternatively, the light source 120 may be a light source having a variable wavelength. In addition to replacing a light source having a specific wavelength, a light source whose wavelength is changed to a plurality of wavelengths may be used. By using a variable-wavelength light source such as a variable-wavelength laser, the measurement may be performed with one light source while changing the wavelength according to the reflective sample.

In order to derive a wavelength suitable for the measurement of the reflective sample, the measurement for the reflective sample may be performed. A wavelength sensitive to the reflective sample is derived while changing the wavelength. In this case, a wavelength sensitive to the corresponding reflective sample may be derived by analyzing results measured using a variable-wavelength light source or a light source having a wide wavelength that uses a white light source. Alternatively, measurement wavelength information for each reflective sample, which is stored through pre-measurement for each reflective sample, may be used. The measurement wavelength information for each reflective sample may be generated and stored in a lookup table. The measurement wavelength information for a specific reflective sample derived through the measurement is stored, and then used for measuring the corresponding reflective sample when the same reflective sample is measured by combining the light source having the corresponding measurement wavelength to the light source attachment/detachment unit using the previously stored information.

The light source 120 may emit light having a specific wavelength in the form of a pulse. Although the light may be emitted continuously, the light may be emitted in the form of a pulse, thereby enabling rapid measurement. Since an interference fringe may be generated in each pulse, the light may be emitted in the form of a pulse and irradiated only to a region to be measured, thereby quickly performing the measurement of the region.

As disclosed in the Korean Patent Publication No. 1812608, the spectrometer 150 may be configured as a device for measuring spectrum polarization information of a reflective sample to be measured by a snapshot/single shot method in real-time/high speed.

Figure 3:
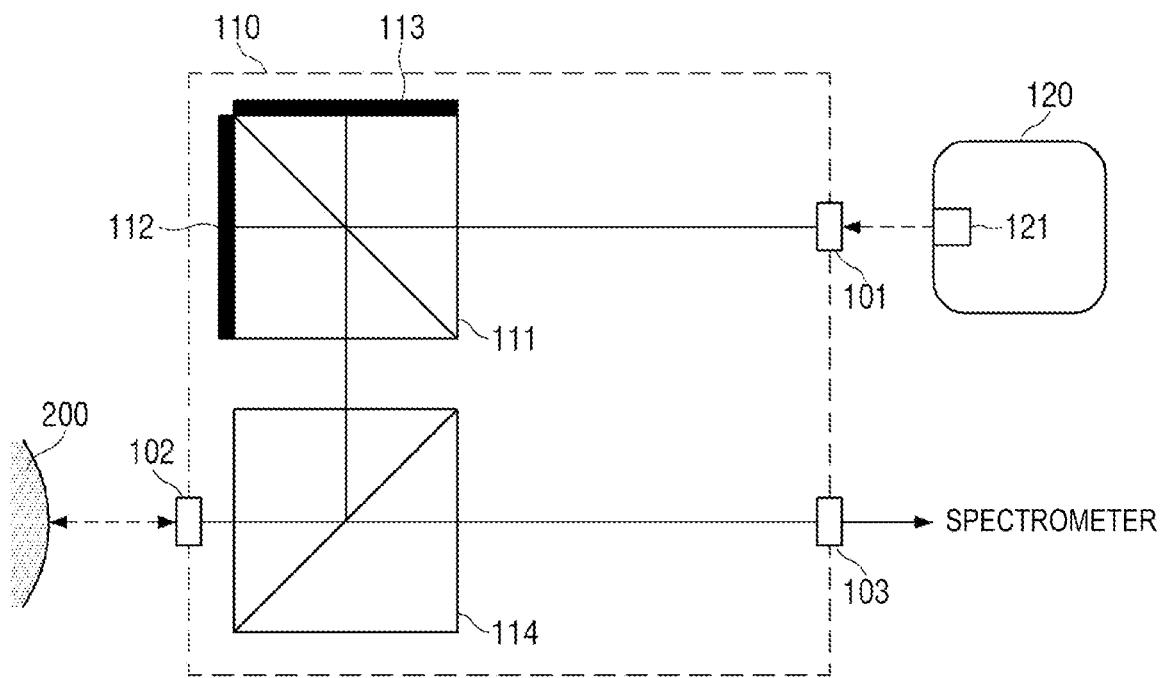
FIG. 3 is a block diagram illustrating a detailed configuration of the spectropolarimetric apparatus according to one embodiment of the present invention.

FIG. 3 is a block diagram illustrating a detailed configuration of the spectropolarimetric apparatus 100 according to the first embodiment of the present invention. The spectropolarimetric apparatus 100 may include the polarization interferometer 110, and may include the light source attachment/detachment unit to which the light source 120 is detachably coupled and the spectrometer as a package. The polarization interferometer 110 may include the light input terminal 101, the measurement terminal 102, the light output terminal 103, a first polarization beam splitter 111, a first mirror 112, a second mirror 113, and a second polarization beam splitter 114, all of which may be accommodated in the housing.

Light emitted from the light source 120 is incident on the light input terminal 101, and the incident light is split into first polarized light, which passes through the first polarization beam splitter 111, and second polarized light, which is reflected by the first polarization beam splitter 111. Here, the first polarized light may be P-polarized light, and the second polarized light may be S-polarized light, and vice versa.

At this point, the first mirror 112 is installed on a first surface among surfaces constituting the first polarization beam splitter 111 and reflects the first polarized light transmitted through the first polarization beam splitter 111 to the first polarization beam splitter 111. Here, the first surface may be a surface perpendicular to an incident optical axis. The reflected first polarized light is reflected by the first polarization beam splitter 111 and travels to the second polarization beam splitter 114.

The second mirror 113 is installed on a second surface perpendicular to the first surface and reflects the second polarized light reflected by the first polarization beam splitter 111 to the first polarization beam splitter 111. Here, the second surface may be a surface parallel to the incident optical axis, and may be an upper surface. The reflected second polarized light passes through the first polarization beam splitter 111 and travels to the second polarization beam splitter 114.

In order to generate a high-frequency signal in a spectrum polarization signal, an optical path length of the first polarized light, which is transmitted through the first polarization beam splitter 111 and reflected by the first mirror 112 and then reflected again downward by the first polarization beam splitter 111, is different from an optical path length of the second polarized light reflected by the first polarization beam splitter 111 and then reflected by the second mirror 113. That is, either one optical path length may be formed to be longer than the other optical path length by approximately 20 µm to 60 µm. In this case, the optical path length of the first polarized light may be longer, and the optical path length of the second polarized light may be shorter.

In order to generate such an optical path length difference, a separation distance between the first surface of the first polarization beam splitter 111 and the first mirror 112 may be different from a separation distance between the second surface of the first polarization beam splitter 111 and the second mirror 113. That is, either one of the first mirror 112 and the second mirror 113 may be further separated from the corresponding surface of the first polarization beam splitter 111 than the other one by a difference (approximately 20 µm to 60 µm) in the optical path length.

However, even a slight change in the difference of the optical path length may significantly affect the final measurement result. Accordingly, an error related to the difference in the optical path length in the spectropolarimetric apparatus, which may be generated by various factors such as a manufacturing error or an external temperature, needs to be removed through a calibration process performed in advance. The calibration process allows the magnitude of a signal finally measured by the spectrometer to be maximized and thus contributes to improving the measurement performance or precision of the spectropolarimetric apparatus.

Figure 4:
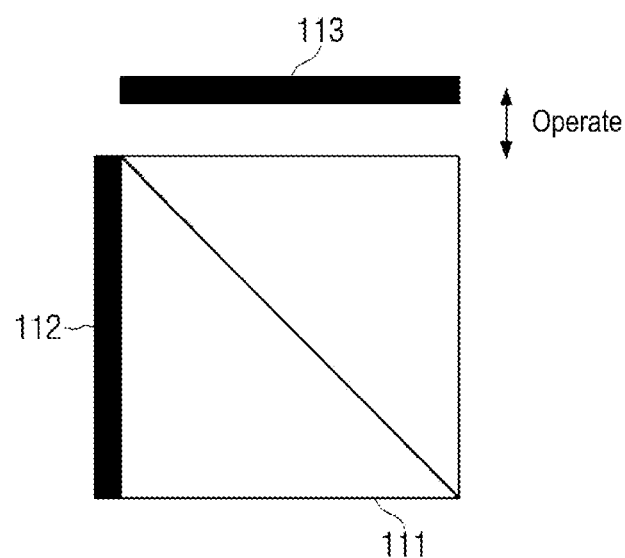
FIG. 4 is a view illustrating a polarization beam splitter and mirrors.

To this end, in the present invention, as shown in FIG. 4, at least one of the mirrors 112 and 113 formed on different surfaces of the first polarization beam splitter 111 may be implemented as a movable mirror. For example, the first mirror 112 formed on the first surface of the first polarization beam splitter 111 may be a fixed mirror fixed to the first polarization beam splitter 111, and the second mirror 113 formed on the second surface may be a movable mirror that may be displaced in a direction perpendicular to the second surface of the first polarization beam splitter 111. As described above, by implementing the second mirror 113 as a movable mirror and adjusting the separation distance from the first polarization beam splitter 111, the difference in the optical path length may be optimally set.

At this point, the second mirror 113, which is a movable mirror, may be installed on a piezoelectric element to electrically control a longitudinal displacement (a z-axis displacement). The piezoelectric element refers to an element having a property that generates electricity when a pressure or displacement is applied thereto, or an element that generates a pressure or displacement when electricity is applied thereto. In particular, the latter property of the piezoelectric element is used. Specifically, the piezoelectric element may be configured as a piezo stage, and includes a fixed member fixed regardless of an electrical signal, and a movable member installed on the fixed member and expanded/contracted according to the electrical signal. The movable member may be displaced (expanded/contracted) by the same amount regardless of a position thereof. Alternatively, the movable member may be displaced only at some predetermined points (two points, three points, and the like), and in this case, due to a positional variation, not only the longitudinal displacement of the movable mirror but also a tilt angle may be finely adjusted.

As described above, the separation distance between the second mirror 113 and the polarization beam splitter 111 may be adjusted by implementing the second mirror 113 as a movable mirror, so that the difference in the optical path length may be adaptively adjusted according to a reflective sample 200 to be measured. However, the present invention is not limited thereto, and in contrast, the first mirror 112 may be designed as a movable mirror, or both the first and second mirrors 112 and 113 may be designed as movable mirrors.

As described above, the first polarized light and the second polarized light directed from the first polarization beam splitter 111 to the second polarization beam splitter 114 through different paths are incident on the first polarization beam splitter 111 in the form of a complex wave. The complex wave incident on the second polarization beam splitter 114 is reflected by the second polarization beam splitter 114 and output to the measurement terminal 102, and the light output to the measurement terminal 102 is irradiated to the reflective sample 200. In addition, the light irradiated to the reflective sample 200 is reflected by the reflective sample 200 and is again incident on the measurement terminal 102.

The light incident on the measurement terminal 102 may pass through the second polarization beam splitter 114 and may be transmitted to the spectrometer through the light output terminal 103. The spectrometer may be, for example, a sensor-array type spectrometer and may measure a Stokes vector, which represents spectrum polarization information of the reflective sample 200, by a snapshot method (in real-time and at high speed). Thus, physical properties such as the material and thickness of the reflective sample 200 may be obtained.

The measurement terminal 102 may be connected to a probe. The probe may include a connection terminal, a probe arm, and a probe head, and the connection terminal may be configured to be detachable with respect to the measurement terminal 102. The probe arm includes an optical fiber or optical cable so that light may be conducted therein, and further includes an outer sheath made of a material that may be held in a bent state. Accordingly, the user may freely adjust a position of the probe head by bending the probe arm. The probe head is a component installed on a side of the probe arm, which is opposite to the connection terminal, to output light to the reflective sample 200 or receive light reflected by the reflective sample 200. The probe head may further include an additional optical system such as a lens at an end thereof. As described above, the optical fiber or the optical cable may be configured to have bidirectionality in light conduction. However, the present invention is not limited thereto, and of course, it is also possible to use two optical fibers or optical cables having unidirectionality. As described above, by making the probe attachable to and detachable from the spectropolarimetric apparatus 100, various lengths and types of probes can be used according to a sample measurement environment.

Figure 5:
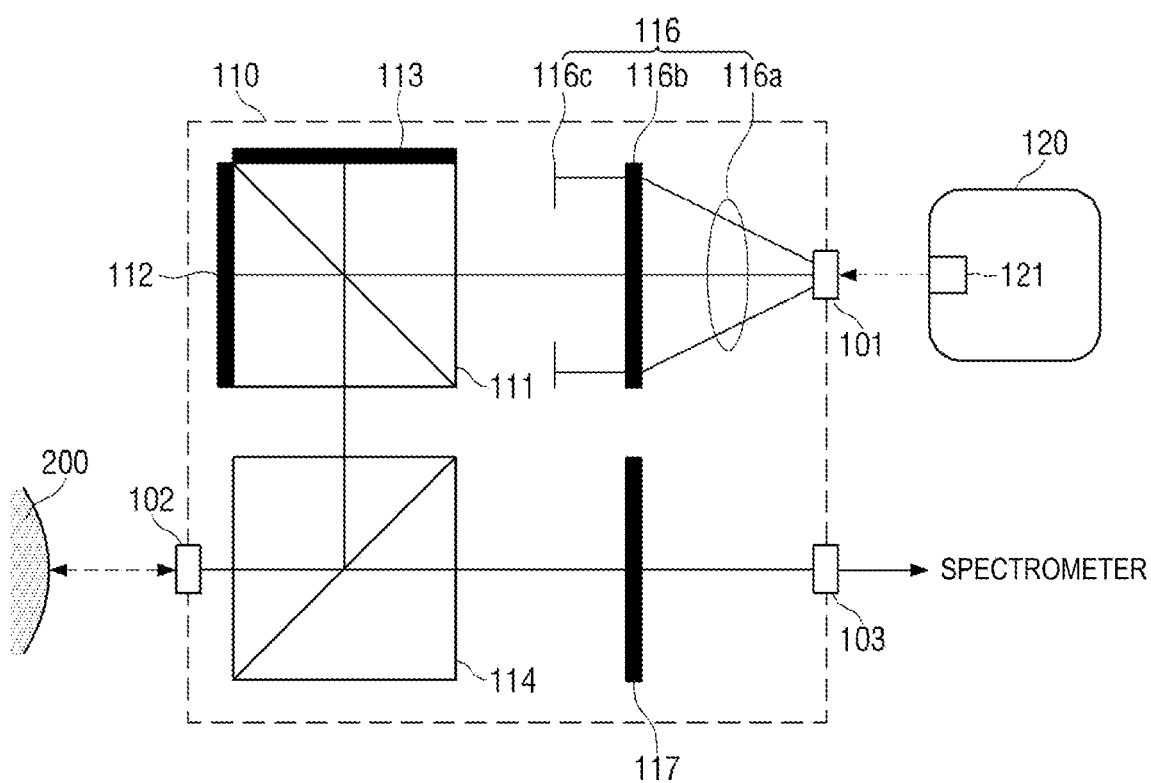
FIG. 5 is a block diagram illustrating a detailed configuration of a spectropolarimetric apparatus according to another embodiment of the present invention.

As shown in FIG. 5, the polarization interferometer 110 may further include an input optical system 116 or an output optical system 117. When a white light source is used as the light source, the input light should be converted into collimated light and incident on the first polarization beam splitter 111, so that the light may be converted into the collimated light through the input optical system 116. The input optical system 116 may include, for example, a collimating lens 116a, a linear polarizer 116b, and an iris 116c.

Specifically, the light input through the light input terminal 101 is converted into collimated light in the collimating lens 116a. The collimated light may be linearly polarized at an angle of 45° by the linear polarizer 116b. In addition, the iris 116c adjusts the magnitude of the linearly-polarized light that has passed through the linear polarizer 116b. The linearly-polarized light adjusted to have an appropriate magnitude by the iris 166c is incident on the first polarization beam splitter 111.

Further, the light incident on the measurement terminal 102 may pass through the second polarization beam splitter 114 and may be transmitted to the spectrometer through the output optical system 117. Two lights incident to the measurement terminal 102 through different paths are eventually incident on the output optical system 117 in the form of interference light. The output optical system 117 may typically include a linear polarizer, but is not limited thereto, and may include an optical system such as an additional lens. For example, the interference light transmitted from the second polarization beam splitter 114 may pass through the output optical system (a linear polarizer, 117) for linearly polarizing light at an angle of 45° and then may be transmitted to the spectrometer through the light output terminal 103.

Figure 6A:
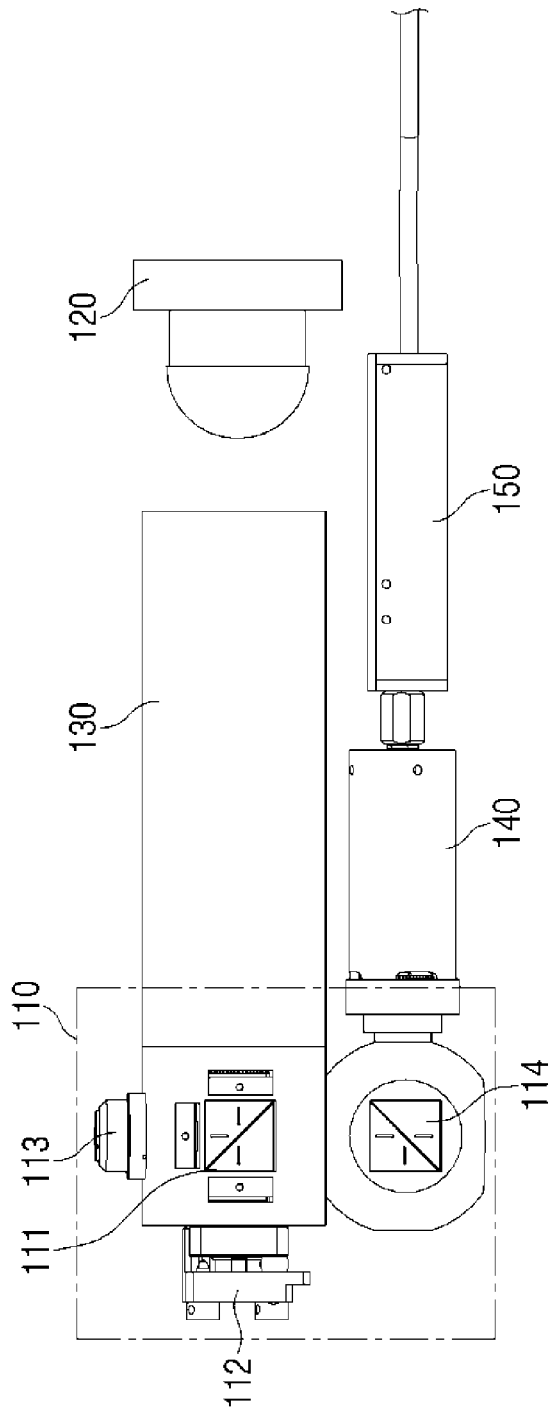
FIG. 6A is a side view of the spectropolarimetric apparatus according to one embodiment of the present invention.
Figure 7:
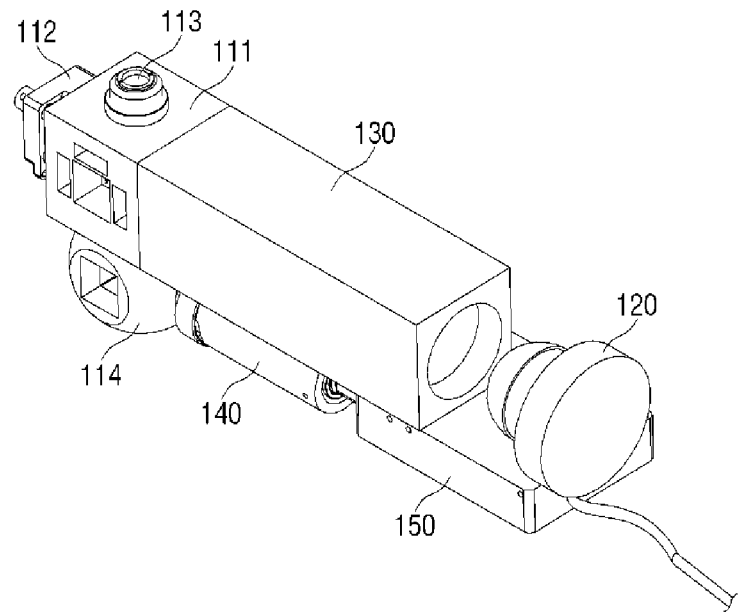
FIGS. 7 and 8 are perspective views of the spectropolarimetric apparatus of FIG. 6A viewed from above and below, respectively.
Figure 8:
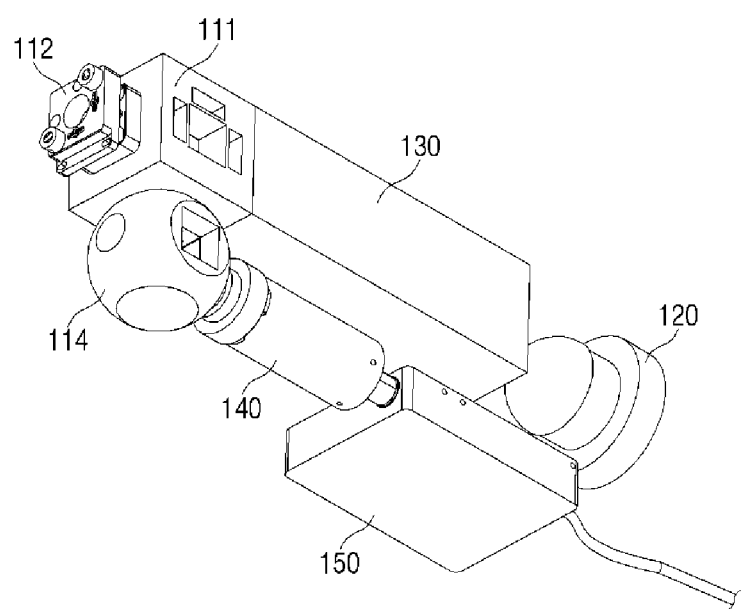

FIG. 6A is a view illustrating a specific configuration of the spectropolarimetric apparatus 100 according to the first embodiment of the present invention, and FIGS. 7 and 8 are perspective views of the spectropolarimetric apparatus 100 according to the first embodiment of the present invention. The spectropolarimetric apparatus 100 includes a light source attachment/detachment unit 130, the light source 120 that is replaceable by being detachably mounted to the light source attachment/detachment unit 130, and the polarization interferometer 110, and may include an output optical system 140 to secure a travel distance of the light emitted from the polarization interferometer 110. In addition, the spectropolarimetric apparatus 100 may further include the spectrometer 150.

The light source 120 may be attachable to and detachable from the light source attachment/detachment unit 130, and the light source 120 is detachably coupled to the light source attachment/detachment unit 130. The light source 120 may be detachably coupled to the light source attachment/detachment unit 130 using a fitting type or a bolt-nut mechanism. As shown in FIG. 7, a groove in which the light source 120 may be inserted may be formed in the light source attachment/detachment unit 130, or a male screw may be formed in the light source 120 and a female screw may be formed in the light source attachment/detachment unit 130 so that the light source 120 and the light source attachment/detachment unit 130 may be detachably coupled to each other. In addition, various structures may be formed in the light source attachment/detachment unit 130 so that the light source 120 is detachably coupled thereto. The light source attachment/detachment unit 130 and the polarization interferometer 110 may be integrally formed, or may each be modularized and combined with each other. An input optical system may be formed in the light source attachment/detachment unit 130. When the light source 120 uses only straight light, the input optical system may not be formed.

Figure 6B:
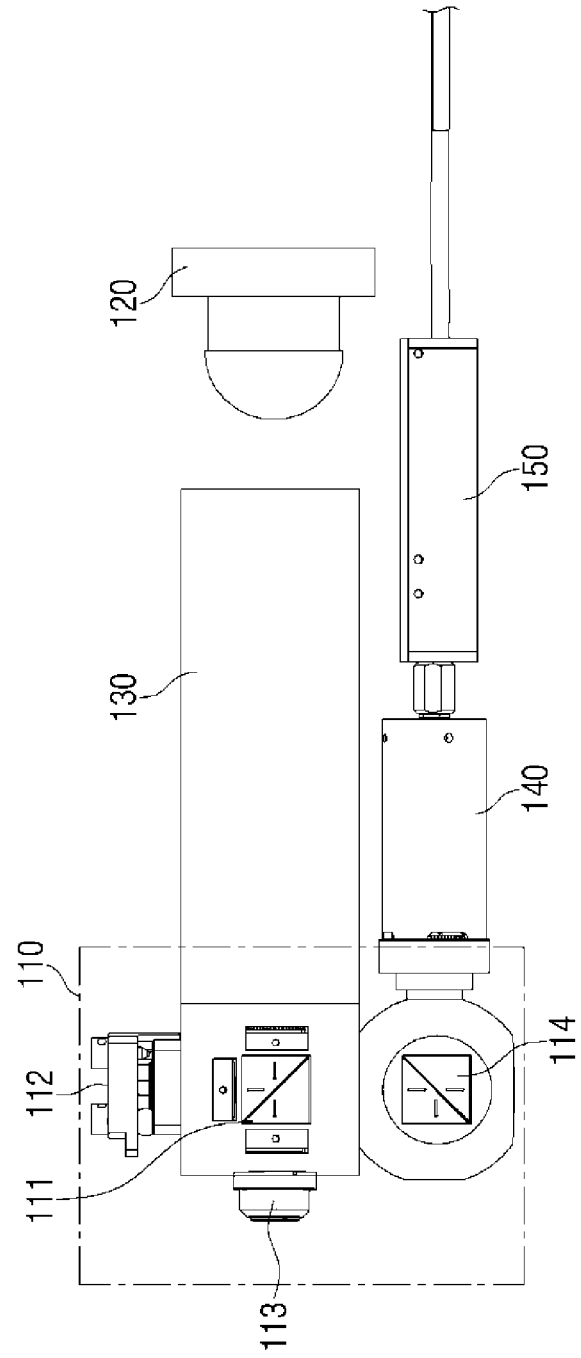
FIG. 6B is a side view of the spectropolarimetric apparatus according to another embodiment of the present invention.

The light emitted from the light source 120 may be incident on the polarization interferometer 110 through the light source attachment/detachment unit 130. The polarization interferometer 110 may split the incident light into the first polarized light and the second polarized light using the first polarization beam splitter, and may generate a difference in the optical path length between the first polarized light and the second polarized light using the first mirror 112 and the second mirror 113 to generate interference. The positions of the first mirror 112 and the second mirror 113 may be opposite to each other, as shown in FIG. 6B.

The complex wave of the first polarized light and the second polarized light travels to the second polarization beam splitter 114, and is reflected by the second polarization beam splitter 114 and irradiated to the reflective sample through the measurement terminal. The light reflected by the reflective sample passes through the second polarization beam splitter 114 to be emitted to the output optical system 140.

The light passing through the output optical system 140 is incident on the spectrometer 150, and the spectrometer 150 analyzes the light incident through the output optical system 140 to measure the physical properties of the reflective sample.

Figure 9:
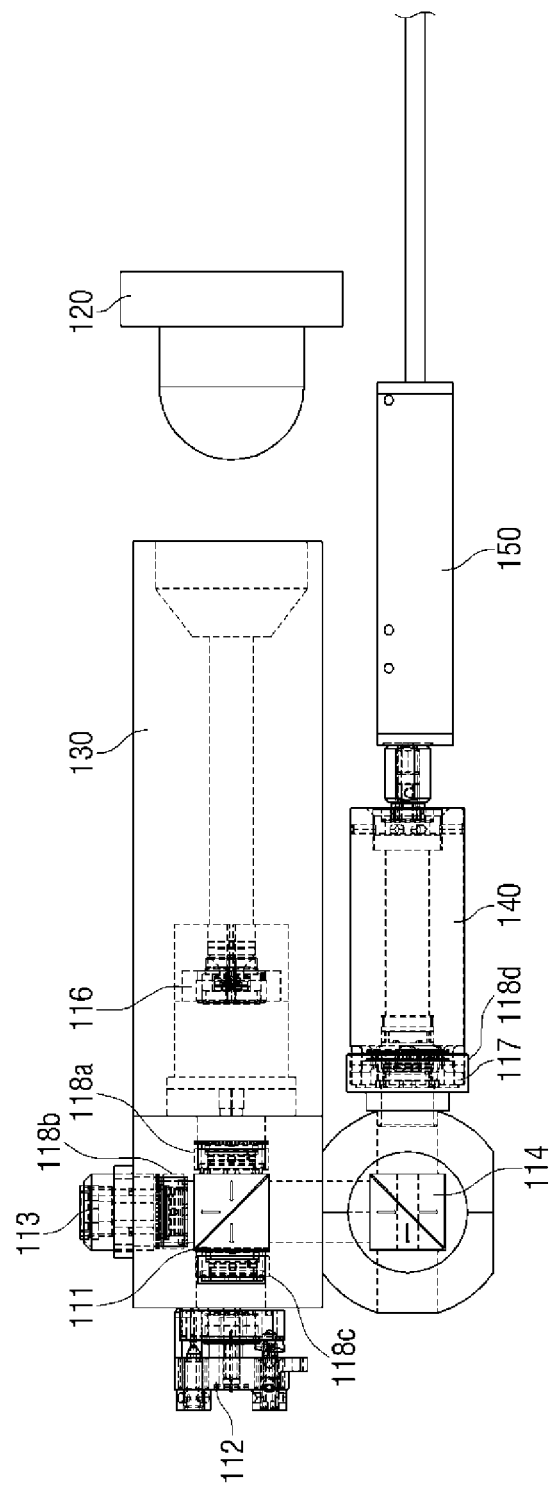
FIG. 9 is an internal perspective view of the spectropolarimetric apparatus according to an embodiment of the present invention.

FIG. 9 is an internal perspective view of the spectropolarimetric apparatus according to an embodiment of the present invention. The input optical system 116 may be formed inside the light source attachment/detachment unit 130 as shown in FIG. 9, the first mirror 112 and the second mirror 113 of the polarization interferometer may be formed as shown in FIG. 9, and the linear polarizer 117 may be formed inside the output optical system 140.

Meanwhile, an optical system such as a polarizer and a polarizing lens may be further provided between the first polarization beam splitter 111 and the first mirror 112 and between the first polarization beam splitter 111 and the second mirror 113, separately from the input optical system 116 or the output optical system 140.

In order to implement desired performance of the spectropolarimetric apparatus, linear polarizers deflected at different angles need to be respectively disposed in the input/output optical systems 116 and 140 and the two optical systems respectively disposed in the vicinity of the first mirror 112 and the second mirror 113. For example, a polarization angle of each of the linear polarizers respectively provided in the input optical system 116 and the output optical system 140 may be 45°, a polarization angle of the linear polarizer disposed in the vicinity of the first mirror 112 may be 90°, and a polarization angle of the linear polarizer disposed in the vicinity of the second mirror 113 may be 0°.

As shown in FIG. 9, the linear polarizer included in the input optical system 116, the linear polarizer included in the output optical system 140, the linear polarizer disposed in the vicinity of the first mirror 112, and the linear polarizer disposed in the vicinity of the second mirror 113 may be disposed in a bracket 118a, a bracket 118d, a bracket 118c, and a bracket 118b, respectively. In this case, each of the linear polarizers may be installed in the corresponding bracket after an installation direction thereof is determined according to a set polarization angle.

In order to efficiently measure a roll-to-roll reflective sample, which is continuously supplied, using the spectropolarimetric apparatus described above, the spectropolarimetric apparatus may be installed on a cradle or a gantry. By installing the spectropolarimetric apparatus on the gantry to be movable in a transverse direction, the reflective sample may be measured at various positions.

The measurement terminal may be installed to face downward when the spectropolarimetric apparatus is mounted on an upper transverse support of the gantry. When the reflective sample is measured by being installed on the gantry, the reflective sample may be a sample that is continuously transferred, such as a flexible substrate transferred between two rollers. Such a reflective sample has a certain lateral size, and thus may be required to continuously measure multiple points as compared with a previously cut sample. The reflective sample, which is continuously supplied, may be measured instantaneously by the spectropolarimetric apparatus at a specific lateral position. In this case, the spectropolarimetric apparatus mounted in a first position may measure a first point of the reflective sample through the measurement terminal, and the user may measure a second point of the reflective sample by moving the position of the spectropolarimetric apparatus in the transverse direction as needed. The lateral position may be moved to an arbitrary position, but may also be accurately placed in predetermined discrete positions. In this case, a fixed or movable stopper (not shown) may be provided at the corresponding position of the transverse support in the transverse direction, thereby guiding a fixed position of the spectropolarimetric apparatus. Although the spectropolarimetric apparatus is illustrated as being mounted on the upper transverse support to measure an upper surface of the reflective sample, the present invention is not limited thereto, and it is also possible to measure a lower surface of the reflective sample by placing the apparatus on a lower transverse support of the gantry. In this case, the spectropolarimetric apparatus should be mounted on the lower transverse support in a vertically symmetrical form since it is necessary to measure the sample upward from below.

Meanwhile, a distance between the measurement terminal of the spectropolarimetric apparatus and the reflective sample may affect the intensity of the signal analyzed by the spectrometer, and thus may also need to be optimally determined. Accordingly, a structure (e.g., a linear motor, a lead screw, or the like) that allows the upper transverse support to be raised and lowered to a certain extent may be additionally provided, and accordingly, the distance between the measurement terminal and the reflective sample may be optimally adjusted. In addition, a plurality of spectropolarimetric apparatuses may be previously disposed at different positions, so that a plurality of points of the reflective sample may be measured at once.

The spectropolarimetric apparatus according to the first embodiment of the present invention has been described above. Hereinafter, a spectropolarimetric apparatus according to a second embodiment will be described.

Figure 10:
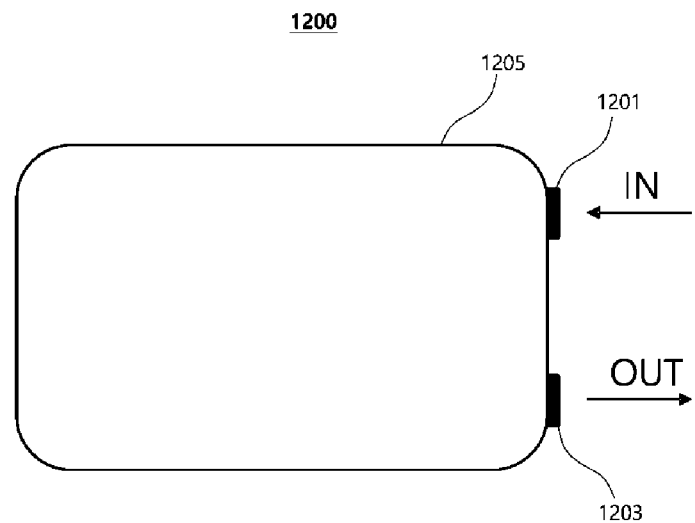
FIG. 10 is a conceptual diagram of an integrated polarization interferometer according to a second embodiment of the present invention.

FIG. 10 is a conceptual diagram of a modularized integrated polarization interferometer 1200 according to the second embodiment of the present invention. The polarization interferometer 1200 may include a light input terminal 1201 to which light emitted from a light source is incident, a light output terminal 1203 from which light from the polarization interferometer 1200 is emitted to a spectrometer, and a housing 1205 in which the two terminals 1201 and 1203 are mounted. As such, the polarization interferometer 1200 may be configured with the housing 1205 to which the light source or spectrometer is attachable and detachable, and thus may be modularized and miniaturized.

Figure 11:
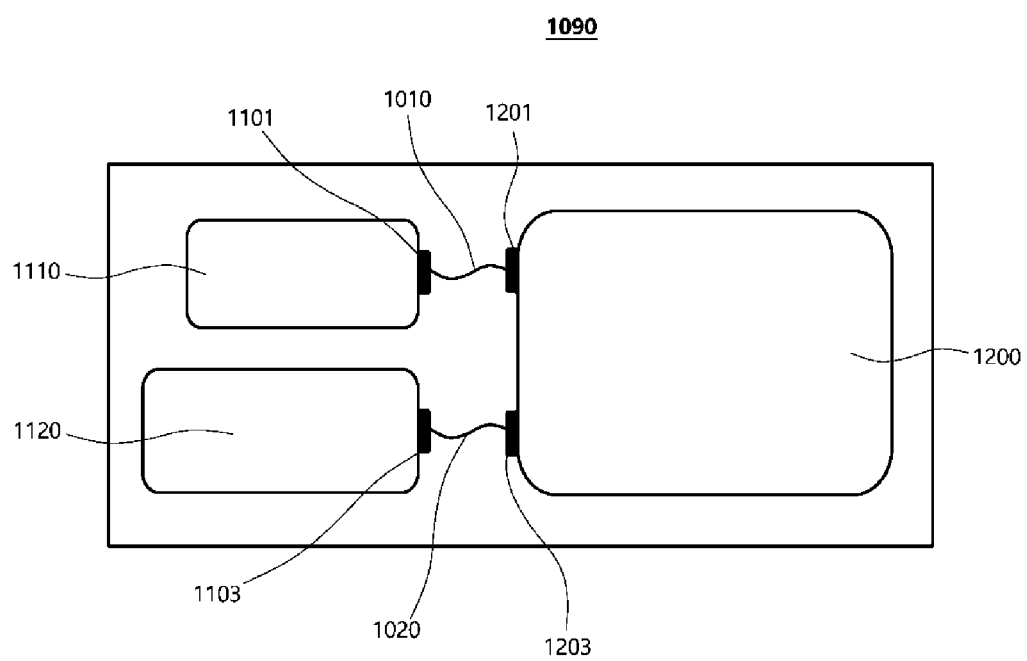
FIG. 11 is a view illustrating a spectropolarimetric apparatus in which a polarization interferometer, a light source, and a spectrometer are packaged together.

As shown in FIG. 11, the polarization interferometer 1200 of FIG. 10 may be packaged in a spectropolarimetric apparatus 1090 together with a light source 1110 and a spectrometer 1120. In this case, as a medium for transmitting light, an optical fiber or an optical cable may be connected between a light source terminal 1101 of the light source 1110 and the light input terminal 1201 of the polarization interferometer 1200, and between the light output terminal 1203 of the polarization interferometer 1200 and a spectrometer terminal 1103 of the spectrometer 1120.

At this point, the polarization interferometer 1200 splits the light emitted from the light source 1110 into a plurality of polarized light beams using a polarization beam splitter, and irradiates at least some of the split polarized light beams to the reflective sample and outputs the reflected light. The light output in this way is provided to the spectrometer 1120, and the spectrometer 1120 analyzes the output light to measure physical properties of the reflective sample.

As the light source 1110, a white light source, for example, a 10 W tungsten-halogen lamp may be used, but the present invention is not limited thereto, and other types of light sources may also be used. In addition, as disclosed in the Korean Patent Publication No. 1812608, the spectrometer 1120 may be configured as a device for measuring a Stokes vector, which represents spectrum polarization information of the reflective sample to be measured, by a snapshot/single shot method in real-time/high speed. Accordingly, the spectropolarimetric apparatus 1090 does not use a mechanically rotating mechanism or an electrical modulation element, and may measure the Stokes vector, which has information about multiple wavelengths, in real-time with only data on a single interference spectrum.

Figure 12:
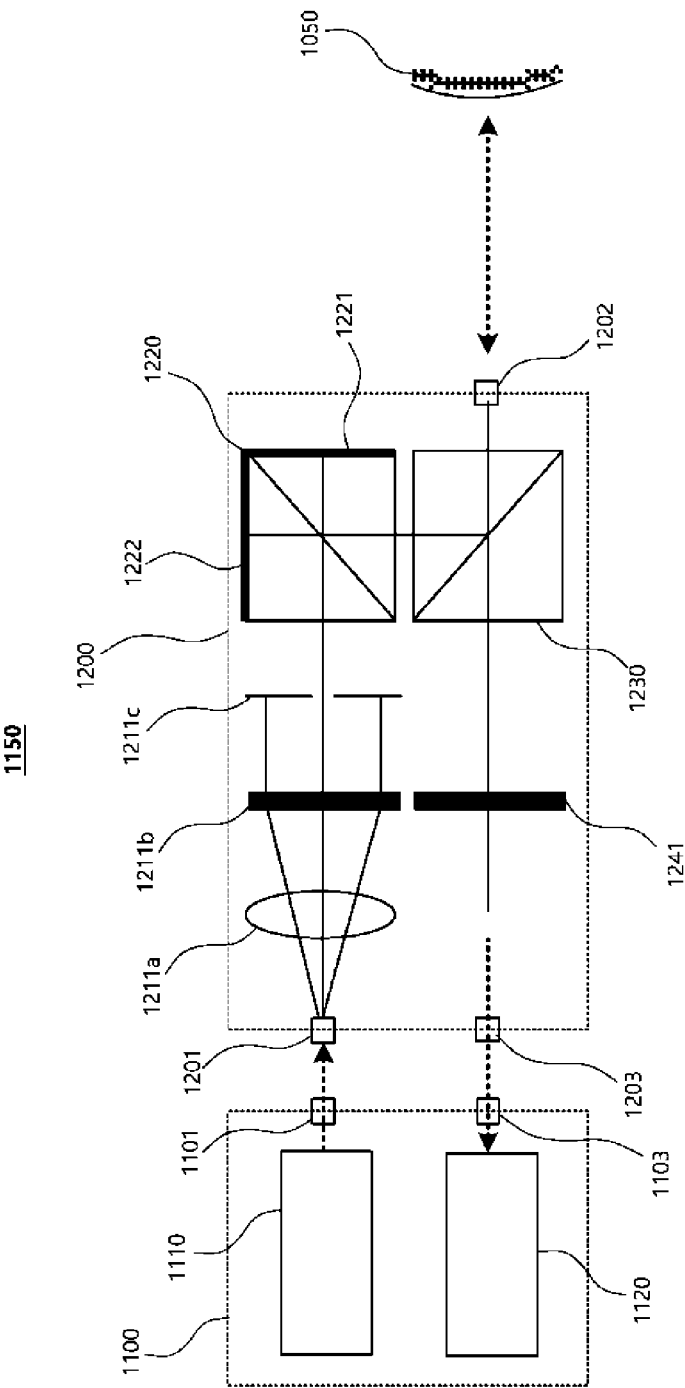
FIG. 12 is a block diagram illustrating a detailed configuration of a polarization interferometer according to another embodiment of the present invention.

FIG. 12 is a block diagram illustrating a detailed configuration of a spectropolarimetric apparatus 1150 according to another embodiment of the present invention. As in FIG. 11, the spectropolarimetric apparatus 1150 may include a light source 1110, a spectrometer 1120, and a polarization interferometer 1200. However, here, the light source 1110 and the spectrometer 1120 may be packaged together in an integration assembly 1100. In this case, as in the embodiment of FIG. 11, both the light source 1110 and the spectrometer 1120 are naturally connected to the polarization interferometer 1200 by only coupling between the integration assembly 1100 and the polarization interferometer 1200 without having to connect each of the light source 1110 and the spectrometer 1120 to the polarization interferometer 1200. At this point, a light source terminal 1101 of the light source 1110 is coupled to a light input terminal 1201 of the polarization interferometer 1200, and a spectrometer terminal 1103 of the spectrometer 1120 is coupled to a light output terminal 1203 of the polarization interferometer 1200.

The polarization interferometer 1200 coupled to the integration assembly 1100 may be configured as a reflectometer type. The polarization interferometer 1200 may include the light input terminal 1201, input optical systems 1211a, 1211b, and 1211c, a first polarization beam splitter 1220, a second polarization beam splitter 1230, an output optical system 1241, the light output terminal 1203, and a measurement terminal 1202.

Light irradiated and transmitted from the light source 1110 is incident on the light input terminal 1201. The incident light is incident on the first polarization beam splitter 1220 through the input optical systems 1211a, 1211b, and 1211c. The input optical systems 1211a, 1211b, and 1211c may include, for example, a collimating lens 1211a, a linear polarizer 1211b, and an iris 1211c.

Specifically, the light input through the light input terminal 1201 is converted into collimated light in the collimating lens 1211a. The collimated light may be linearly polarized at an angle of 45° by the linear polarizer 1211b. In addition, the iris 1211c adjusts the magnitude of the linearly-polarized light that has passed through the linear polarizer 1211b. The linearly-polarized light adjusted to have an appropriate magnitude by the iris 1211c is incident on the first polarization beam splitter 1220.

The incident light is split by the first polarization beam splitter 1220. At this point, two mirrors 1221 and 1222 are installed on two surfaces of surfaces constituting the first polarization beam splitter 1220. The first polarization beam splitter 1220 transmits P-polarized light to be incident on a first mirror 1221, and reflects S-polarized light to be incident on a second mirror 1222. Specifically, the first mirror 1221 may be attached to one side surface (a surface perpendicular to an incident optical axis) of the first polarization beam splitter 1220 to reflect the P-polarized light, and the second mirror 1222 may be attached to an upper surface (a surface parallel to the incident optical axis) of the first polarization beam splitter 1220 to reflect the S-polarized light.

In order to generate a high-frequency signal in a spectrum polarization signal, an optical path length of the P-polarized light, which is transmitted through the first polarization beam splitter 1220 and reflected by the first mirror 1221 and then reflected again downward by the first polarization beam splitter 1220, is different from an optical path length of the S-polarized light reflected by the first polarization beam splitter 1220 and then reflected by the second mirror 1222. That is, either one optical path length may be formed to be longer than the other optical path length by approximately 20 μm to 60 μm. In this case, the optical path length of the P-polarized light may be longer and the optical path length of the S-polarized light may be shorter.

In order to generate such an optical path length difference, a separation distance between the first surface of the first polarization beam splitter 1220 and the first mirror 1221 may be different from a separation distance between the second surface of the first polarization beam splitter 1220 and the second mirror 1222. That is, either one of the first mirror 1221 and the second mirror 1222 may be further separated from the corresponding surface of the first polarization beam splitter 1220 than the other one by the difference (approximately 20 μm to 60 μm) in the optical path length.

However, even a slight change in the difference of the optical path length may significantly affect the final measurement result. Accordingly, an error related to the difference in the optical path length in the spectropolarimetric apparatus 1150, which may be generated by various factors such as a manufacturing error or an external temperature, needs to be removed through a calibration process performed in advance. The calibration process allows the magnitude of a signal finally measured by the spectrometer 1120 to be maximized and thus contributes to improving the measurement performance or precision of the spectropolarimetric apparatus 1150.

Figure 13:
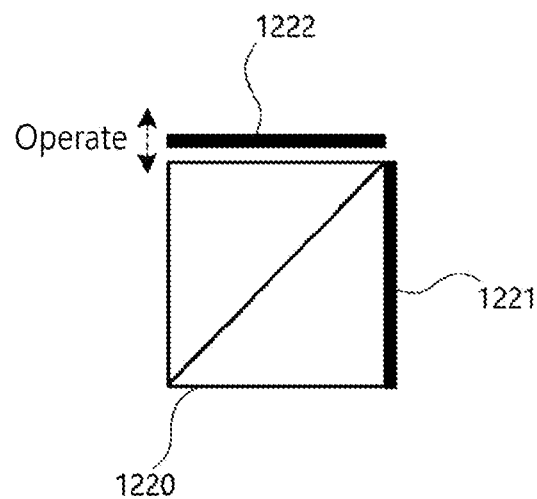
FIG. 13 is a cross-sectional view illustrating a first polarization beam splitter and mirrors disposed adjacent thereto.

To this end, as shown in FIG. 13, at least one of the mirrors 1221 and 1222 formed on different surfaces of the polarization beam splitter 1220 may be implemented as a movable mirror. For example, the first mirror 1221 formed on the side surface of the polarization beam splitter 1220 is a fixed mirror fixed to the polarization beam splitter 1220, and the second mirror 1222 formed on the upper surface of the polarization beam splitter 1220 is a movable mirror that may be displaced in a direction perpendicular to the upper surface of the polarization beam splitter 1220. As described above, by implementing the second mirror 1222 as a movable mirror and adjusting the separation distance from the polarization beam splitter 1220, the difference in the optical path length may be optimally set. However, the present invention is not limited thereto, and in contrast, the first mirror 1221 may be designed as a movable mirror, or both the first and second mirrors 1221 and 1222 may be designed as movable mirrors. More specific details on the operation of the movable mirror will be described below with reference to the following drawings.

As a result, the P-polarized light is reflected again by the first polarization beam splitter 1220 and directed toward the second polarization beam splitter 1230, and the S-polarized light passes again through the first polarization beam splitter 1220 and is directed toward the second polarization beam splitter 1230. Accordingly, the P-polarized light and the S-polarized light are incident on the second polarization beam splitter 1230 in the form of a complex wave.

The complex wave incident on the second polarization beam splitter 1230 is reflected by the second polarization beam splitter 1230 and is output to the measurement terminal 1202, and the complex wave output to the measurement terminal 1202 is irradiated to a reflective sample 1050. In addition, the light irradiated to the reflective sample 1050 is reflected by the reflective sample 1050 and is incident again on the measurement terminal 1202.

The light incident on the measurement terminal 1202 passes through the second polarization beam splitter 1230 to be transmitted to the output optical system 1241. As described above, the two lights incident through different paths are eventually incident on the output optical system 1241 in the form of interference light. The output optical system 1241 may typically include a linear polarizer, but is not limited thereto, and may include an optical system such as an additional lens. For example, the interference light transmitted from the second polarization beam splitter 1230 may pass through the linear polarizer 1211b for linearly polarizing light at an angle of 45° and then may be transmitted to the spectrometer 1120 through the light output terminal 1203. The spectrometer 1120 may be, for example, a sensor-array type spectrometer and may measure a Stokes vector, which represents spectrum polarization information of the reflective sample 1050, by a snapshot method (in real-time and at high speed). Thus, physical properties such as the material and thickness of the reflective sample 1050 may be obtained.

Figure 14A:
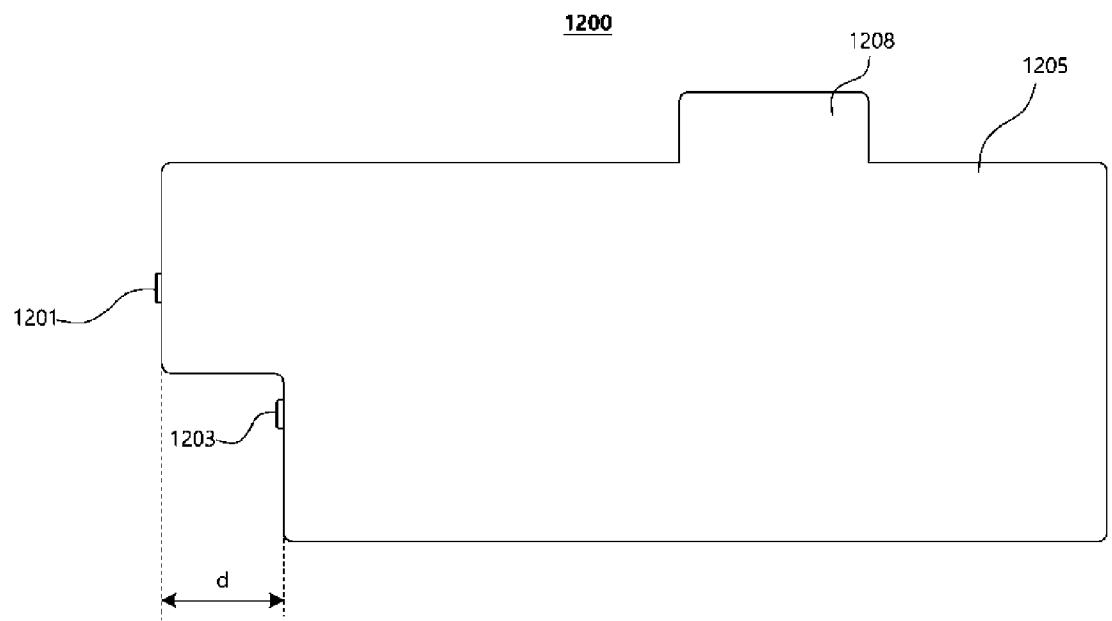
FIGS. 14A to 14C are views of the polarization interferometer coupled to an integration assembly according to the second embodiment of the present invention when viewed from various angles.
Figure 14B:
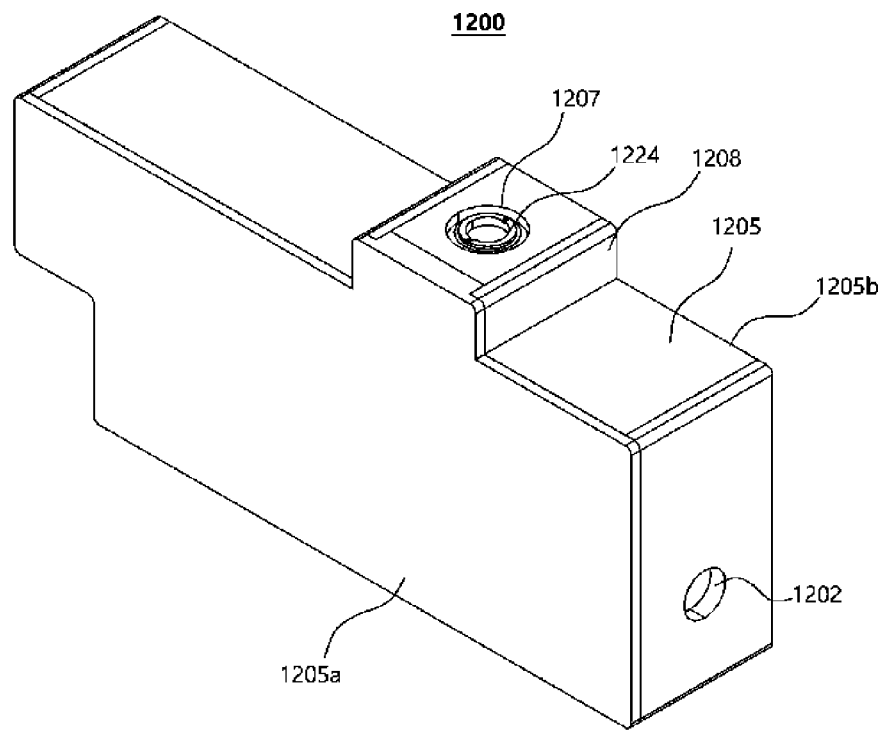
Figure 14C:
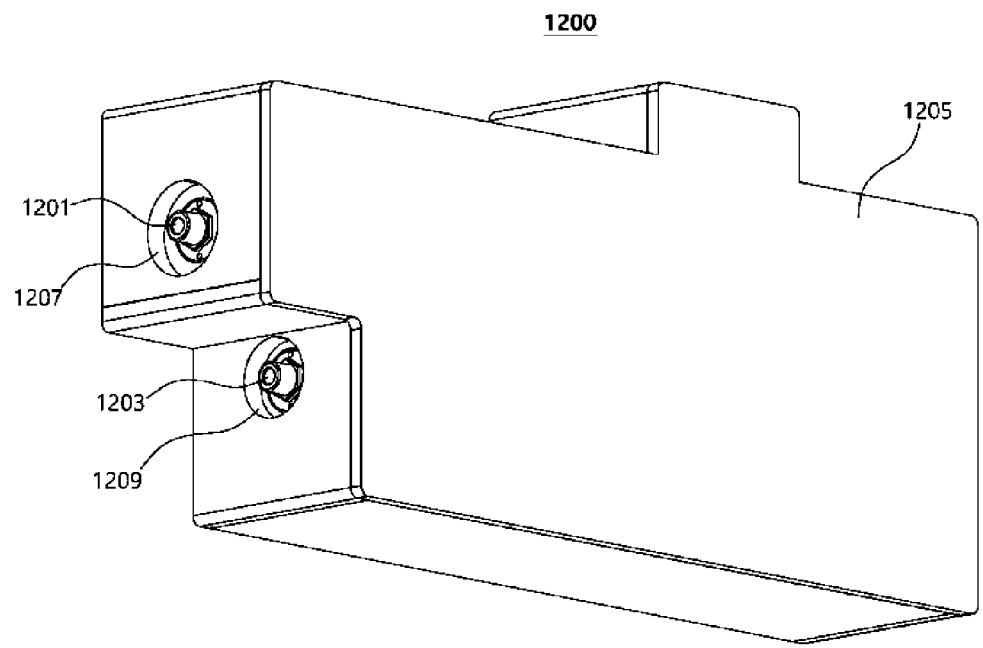

FIGS. 14A to 14C are views of the polarization interferometer 1200 coupled to an integration assembly 1100 according to the second embodiment of the present invention when viewed from various angles. The polarization interferometer 1200 includes the light input terminal 1201 and the light output terminal 1203, which are coupled to the integration assembly 1100 on a left side surface thereof, and a case or a housing 1205 accommodating the internal components.

In this case, referring to FIG. 14A that illustrates a plan view of the polarization interferometer 1200, a stepped portion d is formed between the position of the light input terminal 1201 and the position of the light output terminal 1203 by a predetermined distance in an optical input or output axis direction (hereinafter referred to as an optical axis direction). In particular, the light input terminal 1201 is disposed at a position more protruding than that of the light output terminal 1203. The stepped portion not only allows the integration assembly 1100 to be more securely coupled to the polarization interferometer 1200 but also allows the integration assembly 1100 to more efficiently accommodate the spectrometer 1120 having a size greater than that of the light source 1110.

Further, referring to FIG. 14B, for example, the housing 1205 is configured with a front cover 1205a and a rear casing 1205b. Accordingly, it is possible to install or repair the internal components by opening only the front cover 1205a without disassembling the entire polarization interferometer 1200. In addition, a protrusion 1208 extending upward relative to the other portions and having an opening 1207 may be formed on an upper surface of the housing 1205. The protrusion 1208 accommodates a movable lens 1222 (see FIG. 13) therein and allows the user to operate an operation tool 1224 of the movable lens 1222 through the opening 1207. The user may adjust an optimal position of the movable lens 1222 while moving the movable lens 1222 in a vertical direction through an operation of, for example, rotating the operation tool 1224.

Next, referring to FIG. 14C, openings 1207 and 1209 are respectively formed on two left side surfaces of the polarization interferometer 1200, which are stepped, and the light input terminal 1201 and the light output terminal 1203 are exposed to the outside through the openings 1207 and 1209, respectively. The light input/output terminals 1201 and 1203 may be formed of transparent glass transmitting light or other optical members having special functions.

Figure 15A:
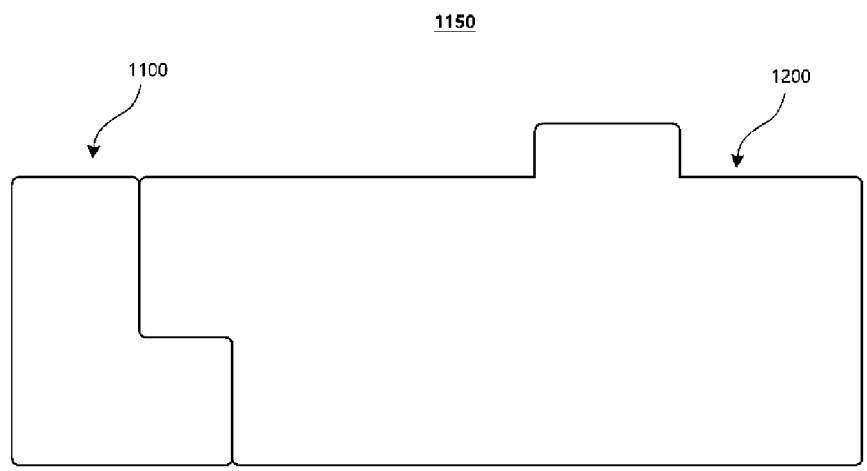
FIGS. 15A and 15B are views illustrating a form in which the polarization interferometer according to the second embodiment of the present invention is coupled to the integration assembly.
Figure 15B:
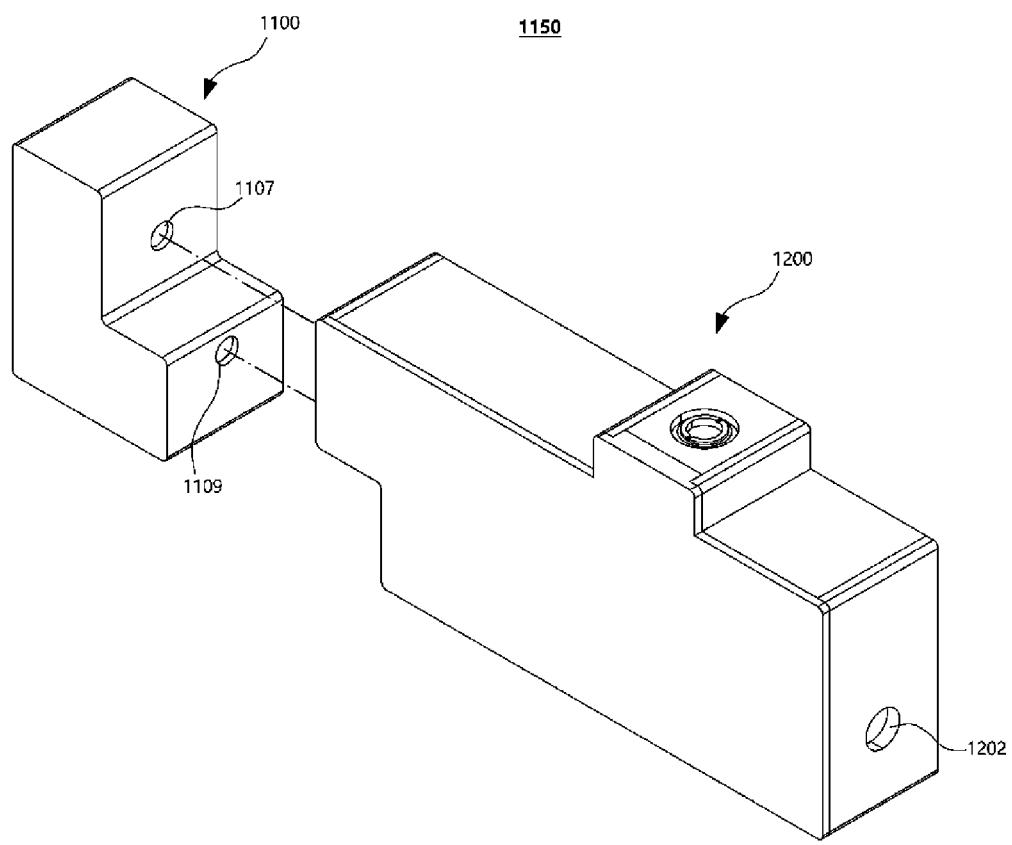

FIGS. 15A and 15B are views illustrating the form in which the polarization interferometer 1200 and the integration assembly 1100 described above are coupled to each other. As shown in FIG. 15A, the stepped portion of the left side surface of the polarization interferometer 1200 is formed to correspond to a stepped portion of the integration assembly 1100. That is, in contrast to the stepped portion of the polarization interferometer 1200, a lower side the stepped portion of the integration assembly 1100, which is a side toward the spectrometer 1120 protrudes more than an upper side of the stepped portion of the integration assembly 1100, which is a side toward the light source 1110. Accordingly, the light source terminal 1101 of the light source 1110 exposed to the outside through an upper opening 1107 of the integration assembly 1100 and the spectrometer terminal 1103 of the spectrometer 1120 exposed to the outside through a lower opening 1109 are aligned with the light input terminal 1201 and the light output terminal 1203 of the polarization interferometer 1200, respectively. Of course, in the present invention, the concept of up and down or left and right is only relative, and thus it will be apparent that the expression may vary depending on the reference direction.

Due to the coupling between these corresponding shapes, the polarization interferometer 1200 and the integration assembly 1100 may be easily coupled in place, and also, may have a compact shape and size while having an overall rectangular shape when being coupled each other, thereby improving miniaturization and mobility of the spectropolarimetric apparatus 1150.

Figure 16A:
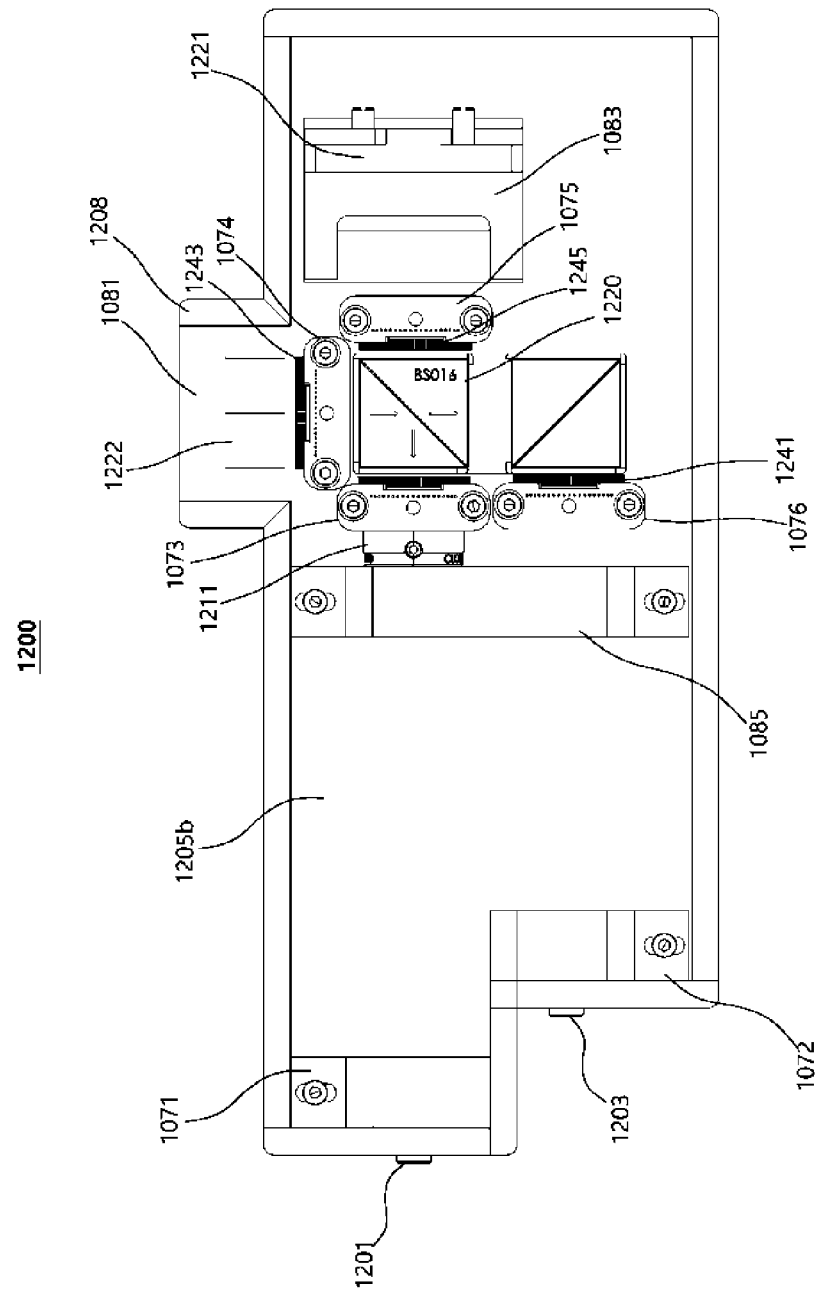
FIG. 16A is a front view of the polarization interferometer shown in FIG. 14B when viewed after removing a front cover.
Figure 16B:
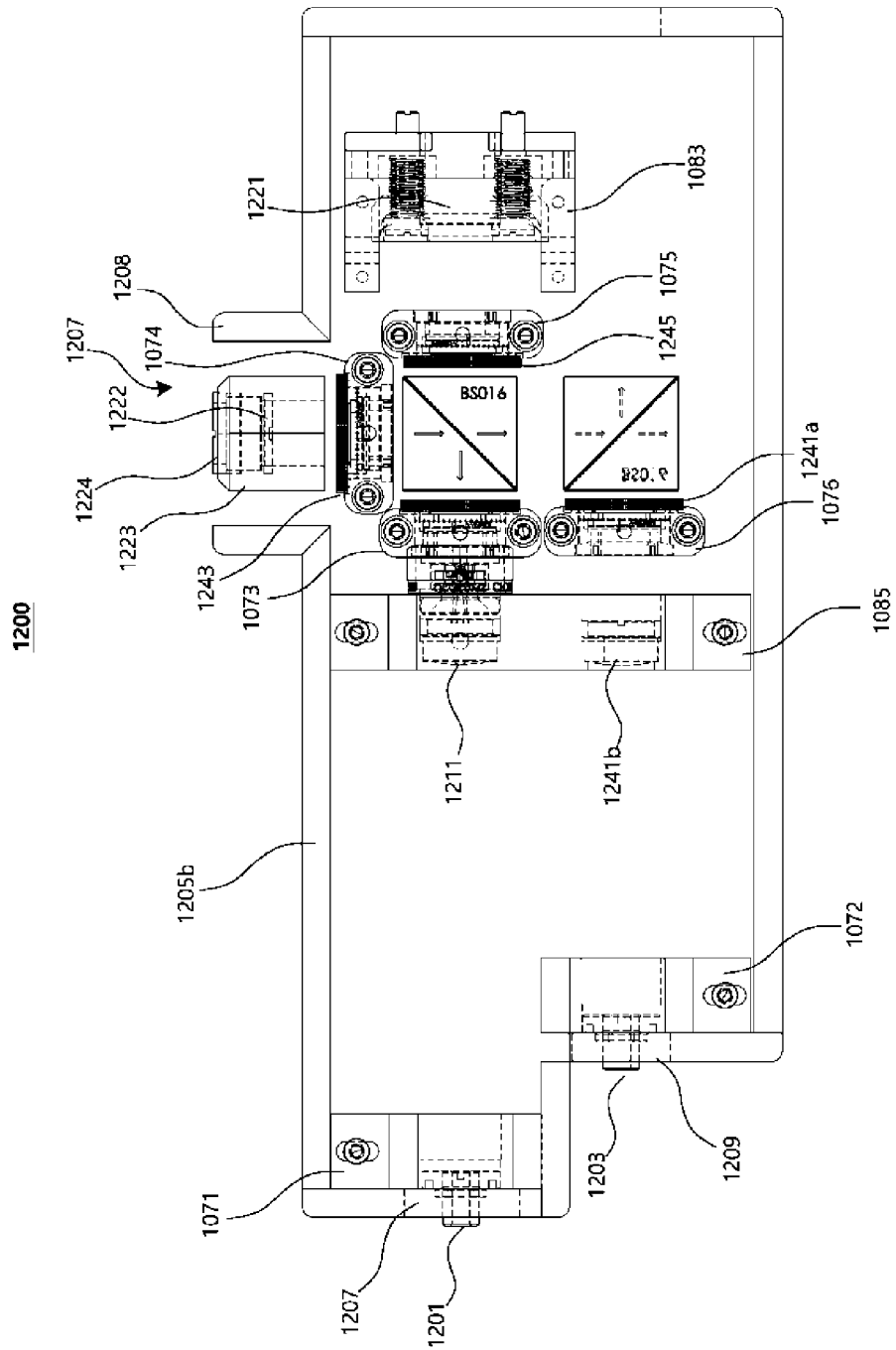
FIG. 16B is a view in which the components hidden in FIG. 16A are also shown by hidden lines.
Figure 16C:
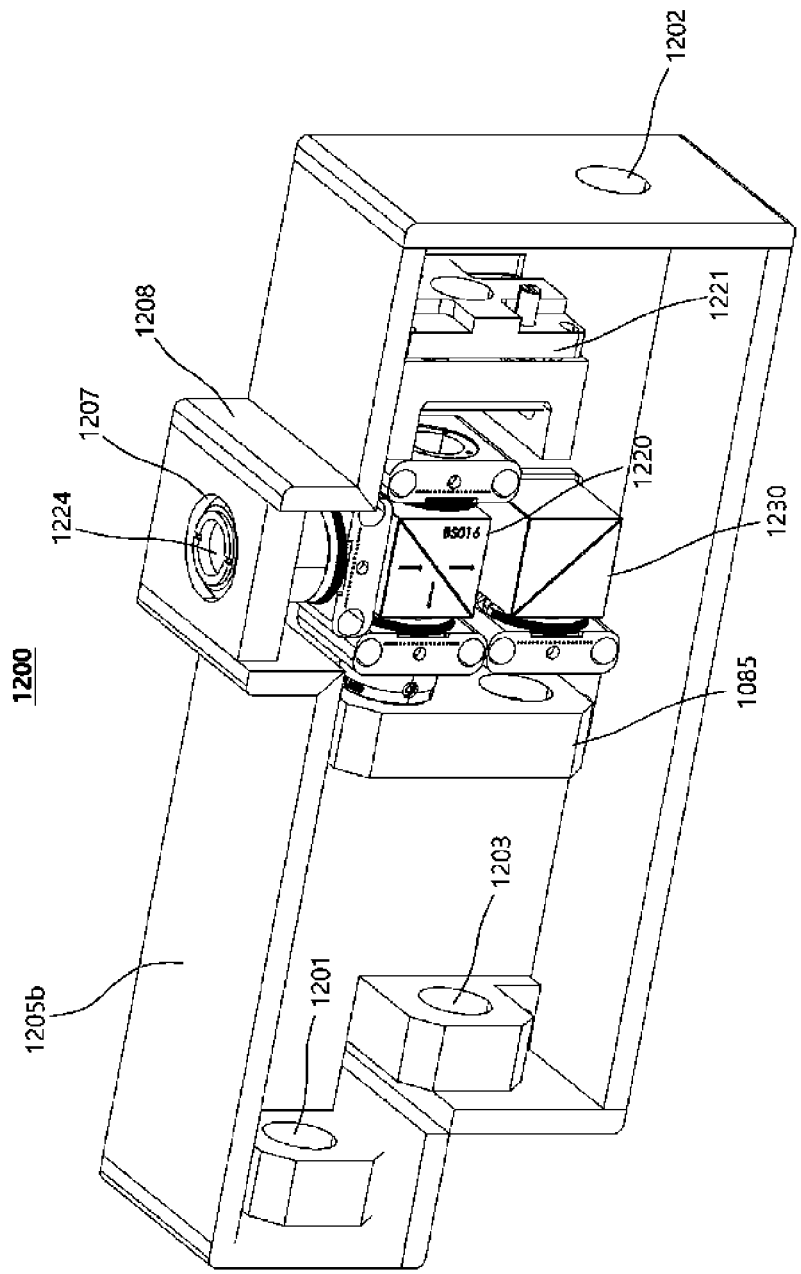
FIG. 16C is a perspective view of FIG. 16A when viewed from a different direction.

FIG. 16A is a front view of the polarization interferometer 1200 shown in FIG. 14B when viewed after removing the front cover 1205a, and FIG. 16B is a view in which the components hidden in FIG. 16A are also shown by hidden lines. In addition, FIG. 16C is a perspective view of FIG. 16A when viewed from a different direction.

Referring to FIG. 16A, the polarization interferometer 1200 includes various brackets 1071, 1072, 1073, 1074, 1075, and 1076 to securely fix optical systems 1243 and 1245 that are provided together with the light input terminal 1201, the light output terminal 1203, the input optical system 1211, the output optical system 1241, and the first and second polarization beam splitters 1220 and 1230. These brackets 1071 to 1076 may be installed in the rear casing 1205b so as to protrude vertically from the rear casing 1205b. In addition, the polarization interferometer 1200 may include a first holder 1081 for holding the movable mirror 1222, a second holder 1083 for holding the fixed mirror 1221, and a third holder 1085 for additionally holding the input optical system 1211 and the output optical system 1241. These brackets or holders may be screw-coupled to the rear casing 1205b or may be coupled thereto in various other known ways.

Meanwhile, the optical systems 1243 and 1245 such as a polarizer and a polarizing lens may be further provided between the first polarization beam splitter 1220 and the movable mirror 1222 and between the first polarization beam splitter 1220 and the fixed mirror 1221, separately from the input optical system 1211 or the output optical system 1241.

According to the second embodiment of the present invention, in order to implement desired performance of the polarization interferometer 1200, linear polarizers deflected at different angles need to be respectively disposed in the input/output optical systems 1211 and 1241 and the two optical systems 1243 and 1245 respectively disposed in the vicinity of the movable mirror 1222 and the fixed mirror 1221. For example, a polarization angle of each of the linear polarizers respectively provided in the input optical system 1211 and the output optical system 1241 may be 45°, a polarization angle of the linear polarizer disposed in the vicinity of the movable mirror 1222 may be 90°, and a polarization angle of the linear polarizer disposed in the vicinity of the fixed mirror 1221 may be 0°.

As shown in FIG. 16A, the linear polarizer included in the input optical system 1211, the linear polarizer included in the output optical system 1241, the linear polarizer disposed in the vicinity of the movable mirror 1222, and the linear polarizer disposed in the vicinity of the fixed mirror 1221 may be disposed in the bracket 1073, the bracket 1076, the bracket 1074, and the bracket 1075, respectively. In this case, each of the linear polarizers may be installed in the corresponding bracket after an installation direction thereof is determined according to a set polarization angle.

Referring to FIGS. 16B and 16C, the opening 1207 penetrating upward is provided in the protrusion 1208 formed on an upper surface of the rear casing 1205b. The user may operate the operation tool 1224 through the opening 1207 to allow the movable lens 1222 to be adjusted vertically with respect to a lens accommodation portion 1223. The operation tool 1224, for example, is screw-coupled to the accommodation portion 1223 so that the user may adjust the movable lens 1222 in the vertical direction by rotating the operation tool 1224. However, the present invention is not limited thereto, and the operation tool 1224 may be implemented by a linear motor or a piezo stage capable of displacing the movable lens 1222 in a linear direction by electrical control.

The presence of the protrusion 1208 extending from the upper surface of the rear casing 1205b contributes to accommodating the movable lens 1222 in a compact manner and allowing the user to easily adjust the position of the movable lens 1222.

Figure 17:
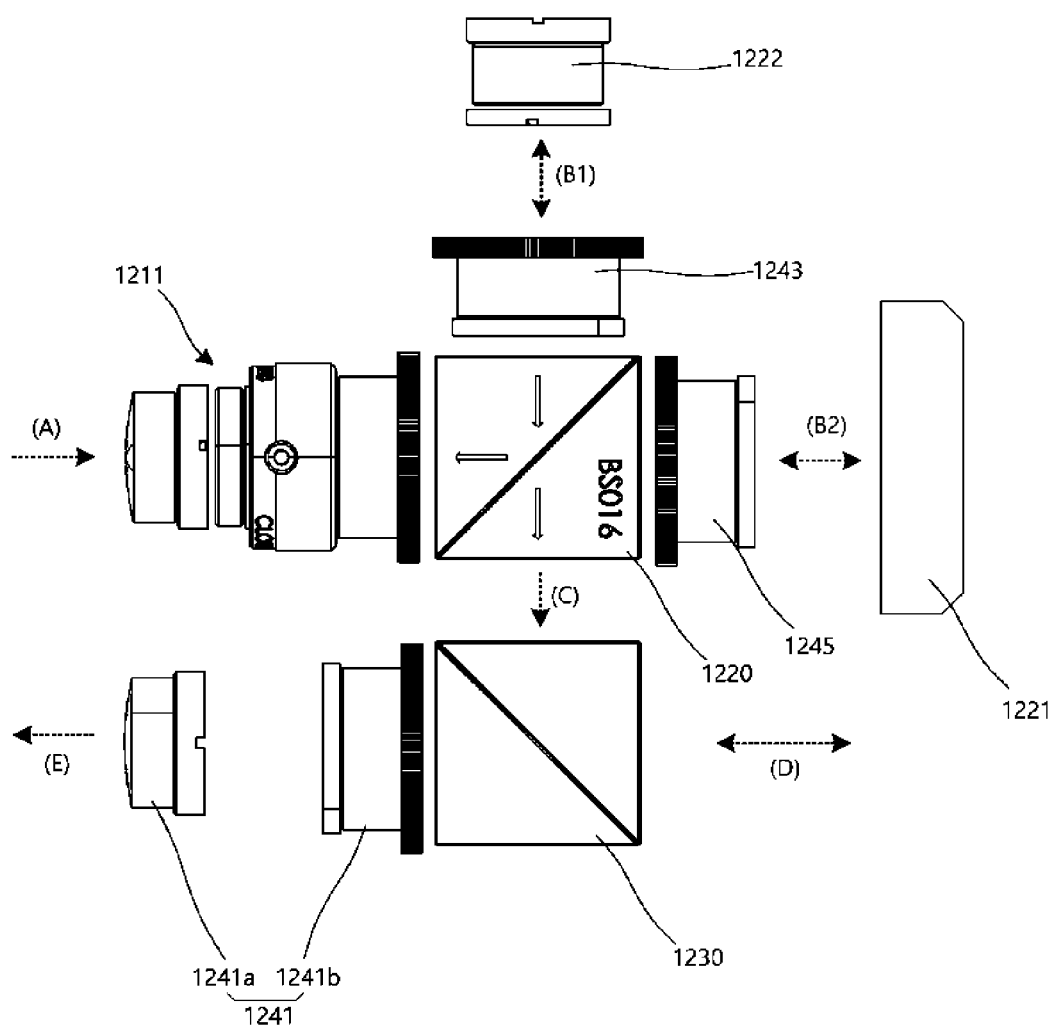
FIG. 17 is a view illustrating a process in which light is input/output and interfered inside the polarization interferometer.

FIG. 17 is a view illustrating a process in which light is input/output and interfered inside the polarization interferometer 1200. Light A incident from the light source is first incident on the first polarization beam splitter 1220 through the input optical system 1211, a portion B1 of the incident light is directed toward the upper movable mirror 1222, and another portion B2 thereof is directed to the right fixed mirror 1221. Accordingly, the portion B1 and another portion B2 of the light are reflected respectively by the movable mirror 1222 and the fixed mirror 1221 and incident again to the first polarization beam splitter 1220, and then overlap each other in a state of having an optical path difference and incident on the second polarization beam splitter 1230 in the form of a complex wave.

Light C incident on the second polarization beam splitter 1230 is emitted toward the reflective sample 1050 and then reflected by the reflective sample 1050 and returned ("D" in FIG. 17) again to the second polarization beam splitter 1230.

The returned light D is finally emitted ("E" in FIG. 17) to the spectrometer 1120 through the output optical system 1241.

In order to efficiently measure the roll-to-roll reflective sample 1050, which is continuously supplied, using the spectropolarimetric apparatus 1150 described above, a cradle or a gantry capable of mounting the apparatus 1150 needs to be installed.

Figure 18A:
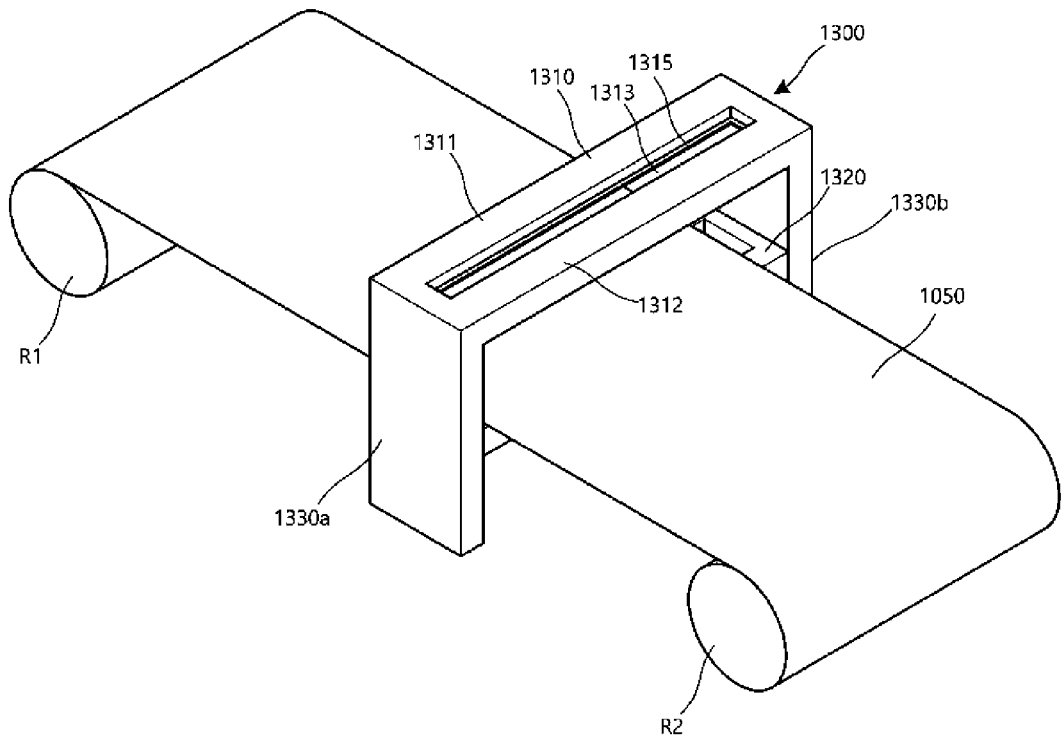
FIG. 18A is a perspective view illustrating a gantry on which a spectropolarimetric apparatus according to the second embodiment of the present invention may be mounted.
Figure 18B:
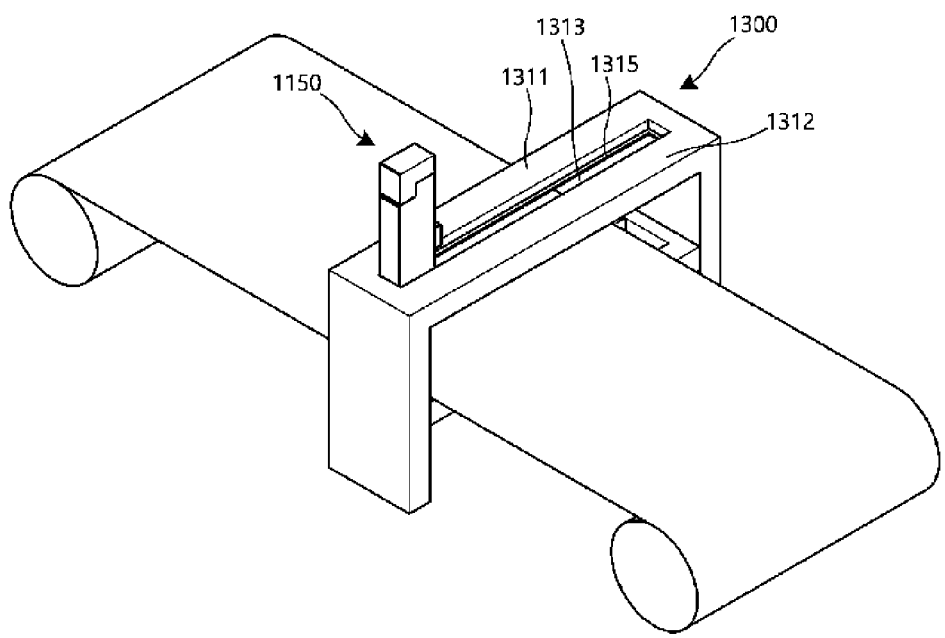
FIG. 18B is a perspective view illustrating a spectropolarimetric system including the gantry and the spectropolarimetric apparatus mounted on the gantry.

FIG. 18A is a perspective view of a gantry 1300 on which the spectropolarimetric apparatus 1150 according to the second embodiment of the present invention may be mounted, and FIG. 18B is a perspective view illustrating a spectropolarimetric system 1400 including the gantry 1300 and the spectropolarimetric apparatus 1150 mounted on the gantry 1300. Since the spectropolarimetric apparatus 1150 is movable in the transverse direction on the gantry 1300, the reflective sample 1050 may be measured at various positions.

The gantry 1300 includes, for example, transverse supports 1310 and 1320 extending in the transverse direction above and/or below the film-type reflective sample 1050 and two leg portions 1330a and 330b that vertically support the transverse supports 1310 and 1320. In addition, the transverse supports 1310 and 1320 may include two guide rails 1311 and 1312 extending in the transverse direction, a slot 1313 formed to be elongated in the transverse direction between the two guide rails 1311 and 1312, and a lip portion 1315 protruding slightly into the slot 1313 to prevent the spectropolarimetric apparatus 1150 mounted on the slot 1313 from being separated downward.

When the spectropolarimetric apparatus 1150 is mounted on an upper transverse support 1310 of the gantry 1300, the measurement terminal 1202 is directed downward and the integration assembly 1100 is positioned above the polarization interferometer 1200.

Meanwhile, the reflective sample 1050 may be a sample that is continuously transferred, such as a flexible substrate transferred between two rollers R1 and R2. The reflective sample 1050 has a certain lateral size, and thus may be required to continuously measure multiple points as compared with a previously cut sample.

Figure 18C:
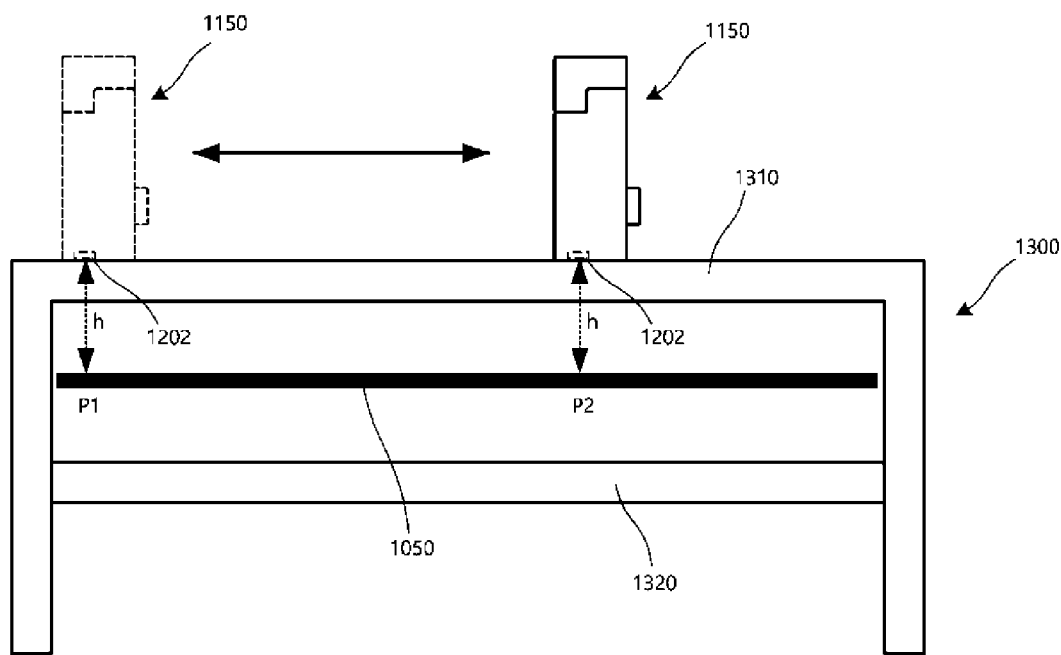
FIG. 18C is a view illustrating an example of changing a position of the spectropolarimetric apparatus on the gantry.

Referring to FIG. 18C, the reflective sample 1050, which is continuously supplied, may be instantaneously measured by the spectropolarimetric apparatus 1150 placed in a specific lateral position. In this case, the spectropolarimetric apparatus 1150 mounted at a first position may measure a first point P1 of the reflective sample 1050 through an opening (the measurement terminal, 1202), and the user may measure a second point P2 of the reflective sample 1050 by moving the position of the spectropolarimetric apparatus 1150 in the transverse direction as needed. The position to be moved laterally may be any position, but the positioning may allow to be accurately placed on predetermined discrete positions. In this case, a fixed or movable stopper (not shown) may be provided at the corresponding position of the transverse support in the transverse direction, thereby guiding a fixed position of the spectropolarimetric apparatus 1150.

In FIGS. 18B and 18C, the spectropolarimetric apparatus 1150 is illustrated as being mounted on the upper transverse support 1310 to measure an upper surface of the reflective sample 1050, but the present invention is not limited thereto, and the spectropolarimetric apparatus 1150 may also be mounted on a lower transverse support 1320 to measure a lower surface of the reflective sample 1050. In this case, the spectropolarimetric apparatus 1150 should be mounted on the lower transverse support 1320 in a vertically symmetrical form with respect to FIG. 18C because it is necessary to measure the sample upward from below.

Meanwhile, a distance h between the measurement terminal 1202 of the spectropolarimetric apparatus 1150 and the reflective sample 1050 may also affect the intensity of a signal analyzed by the spectrometer 1120, and thus may also need to be optimally determined. Accordingly, a structure (e.g., a linear motor, a lead screw, or the like) that allows the upper transverse support 1310 to be raised and lowered to a certain extent may be additionally provided, and accordingly, the distance h between the measurement terminal 12020 and the reflective sample 1050 may be optimally adjusted.

Further, in the embodiment illustrated in FIGS. 18B and 18C, it has been described that one spectropolarimetric apparatus 1150 is moved on the gantry 1300, but the present invention is not limited thereto, and a plurality of spectropolarimetric apparatus 1150 may also be disposed at different positions on the slot 1313 in advance and measure several points of the reflective sample 1050 at once.

The spectropolarimetric apparatus according to the first and second embodiments of the present invention has been described above. Meanwhile, referring to FIG. 4 of the first embodiment and FIG. 13 of the second embodiment, in order to generate a difference in the optical path length, the separation distance between the first surface of the polarization beam splitter and the mirror needs to be different from the separation distance between the second surface of the polarization beam splitter and the second mirror. That is, either one of the first mirror and the second mirror may be positioned further away from or closer to the corresponding surface of the polarization beam splitter by a difference (approximately 20 μm to 60 μm) in the optical path length.

However, even a slight difference in the difference of the optical path length may significantly affect the final measurement result. Therefore, it is necessary to provide a difference value (hereinafter referred to as an optical path difference) of an optimal optical path length capable of removing an error related to a difference in the optical path length in the polarization interferometer which may occur due to various factors such as a manufacturing error or an external temperature, and obtaining the greatest signal intensity in the spectrometer. This ultimately contributes to improving the measurement performance or precision of a specropolarimeter by maximizing the signal intensity measured in a spectrometer.

Figure 19A:
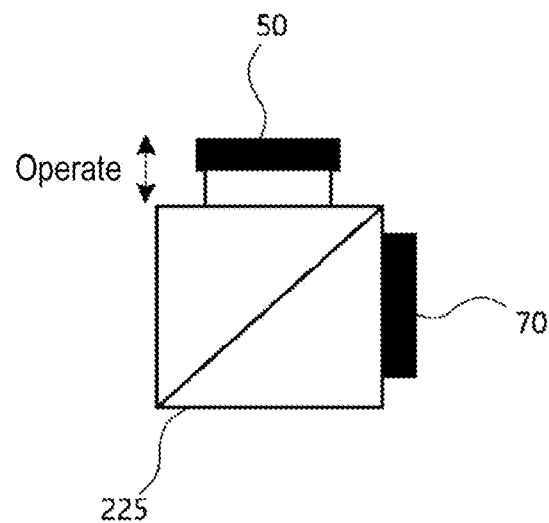
FIGS. 19A to 19C are views illustrating various embodiments of a polarization beam splitter (PBS) assembly.
Figure 19B:
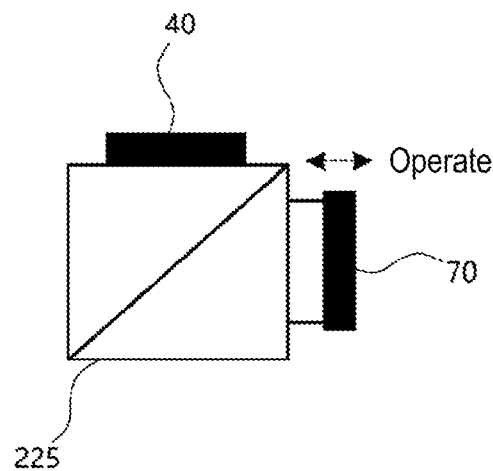

To this end, in the present invention, as illustrated in a polarization beam splitter (PBS) assembly 220 of FIG. 19A, at least one of mirrors 50 and 60 formed on different surfaces of a polarization beam splitter 225 may be implemented as a movable mirror. For example, a second mirror 70 formed on a side surface of the polarization beam splitter 225 is a fixed mirror fixed to the polarization beam splitter 225, and a first mirror 50 formed on an upper surface of the polarization beam splitter 225 is a movable mirror that may be displaced in a direction perpendicular to the upper surface of the polarization beam splitter 225. As described above, by implementing the first mirror 50 as a movable mirror and adjusting a separation distance from the polarization beam splitter 225, a difference in the optical path length may be optimally set. However, the present invention is not limited thereto, and in contrast, as in a PBS assembly 320 illustrated in FIG. 19B, a first mirror 40 may be designed as a fixed mirror, and a second mirror 70 may be designed as a movable mirror.

Figure 19C:
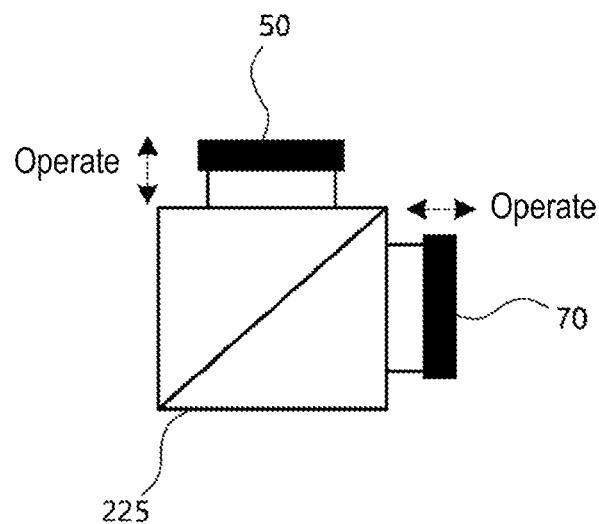

Alternatively, as in a PBS assembly 420 illustrated in FIG. 19C, both first and second mirrors 50 and 70 may be designed as movable mirrors. More specific details regarding the automatic control of the operation of the movable mirror will be described below with reference to the following drawings.

Figure 20A:
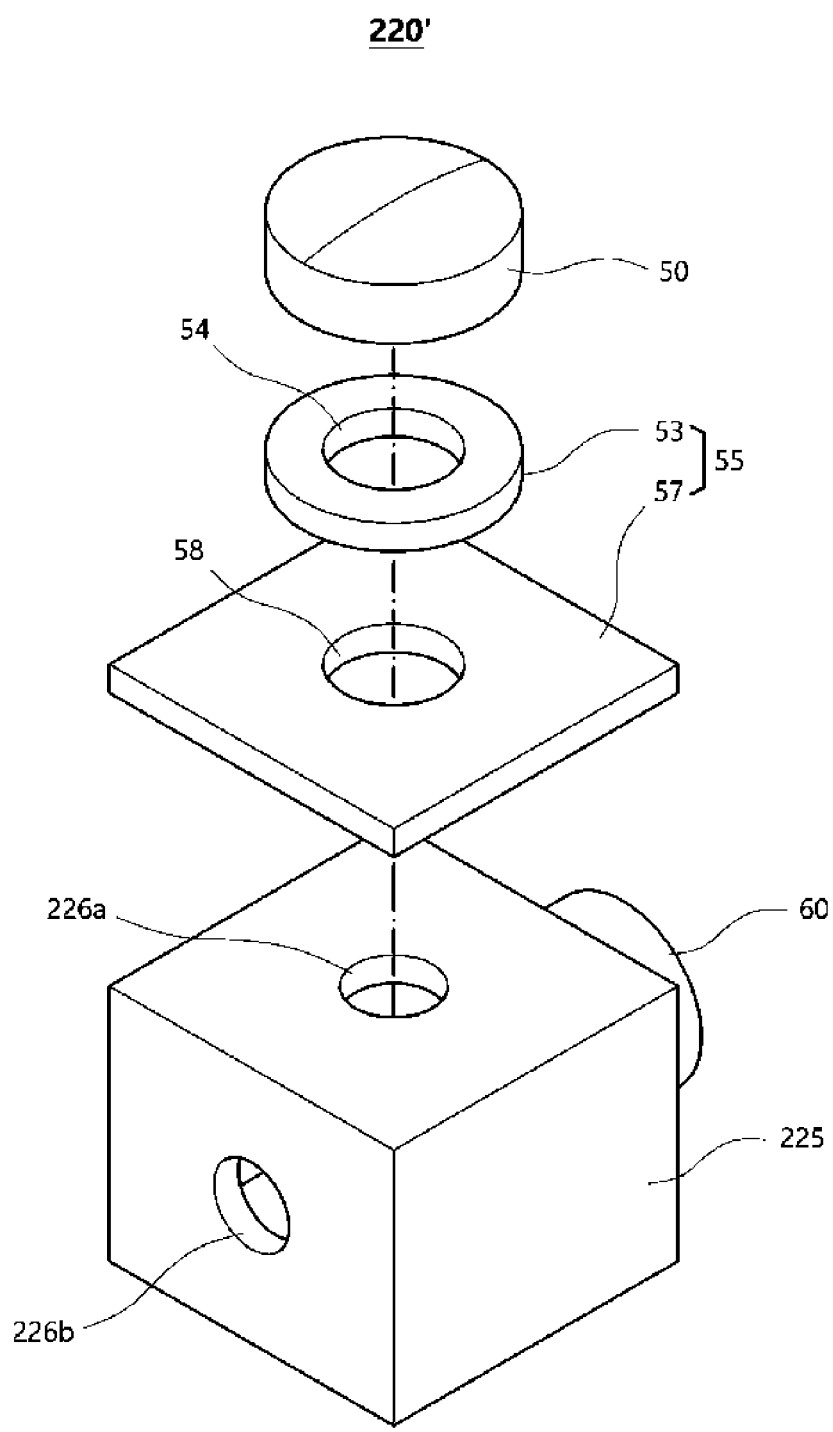
FIG. 20A is an exploded perspective view of the PBS assembly having a movable mirror whose displacement may be controlled by an electrical signal.
Figure 20B:
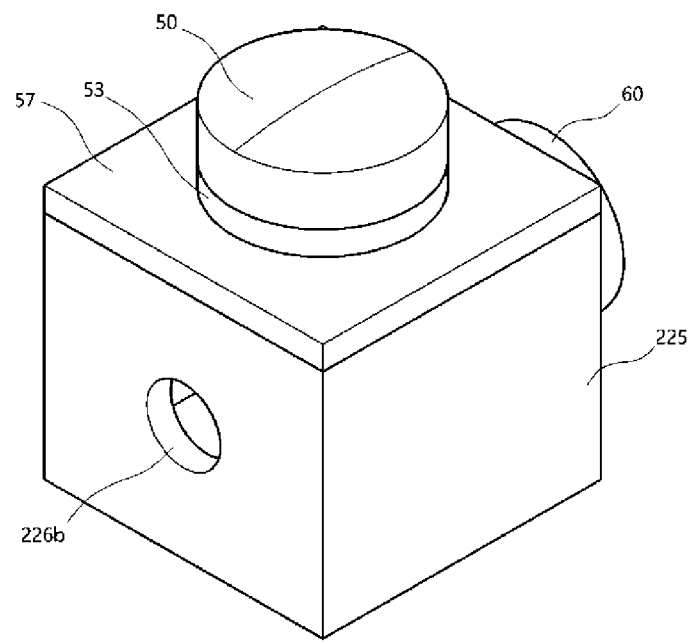
FIG. 20B is an assembly perspective view of the PBS assembly of FIG. 20A.
Figure 20C:
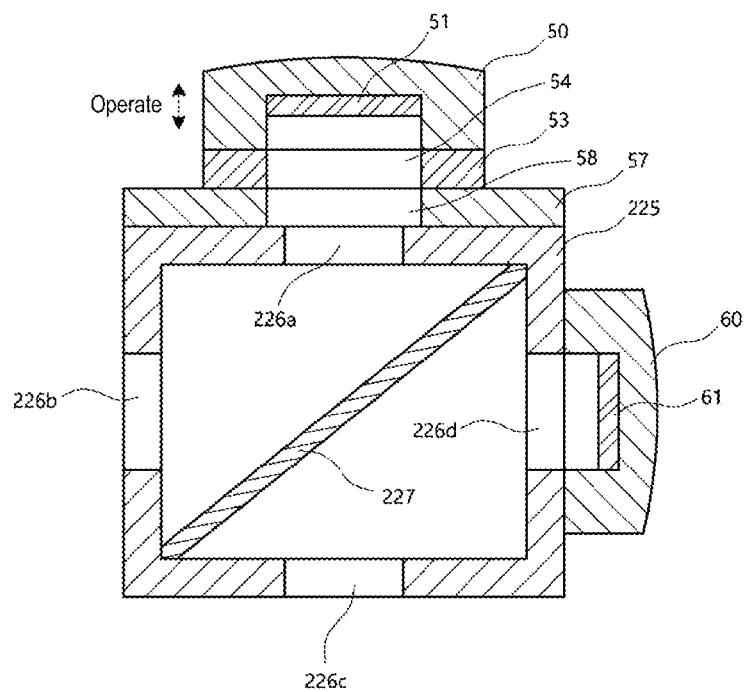
FIG. 20C is a longitudinal cross-sectional view of the PBS assembly of FIG. 20B.

FIGS. 20A to 20C are views illustrating a PBS assembly 220' having a movable mirror whose displacement may be controlled by an electrical signal. As described above with reference to FIG. 19A, a movable mirror 50 is disposed on an upper surface of a polarization beam splitter 225, and a fixed mirror 60 is attached to one side surface of the polarization beam splitter 225.

At this point, the movable mirror 50 may be installed on a piezoelectric element 55 so that a longitudinal displacement (a z-axis displacement) may be electrically controlled. The piezoelectric element 55 refers to an element having a property that generates electricity when a pressure or displacement is applied thereto, or an element that generates a pressure or displacement when electricity is applied thereto. In particular, in the present invention, the latter property of the piezoelectric element 55 is used. Specifically, the piezoelectric element 55 may be configured as a piezo stage, and includes a fixed member 57 fixed regardless of an electrical signal, and a movable member 53 installed on the fixed member 57 and expanded/contracted according to the electrical signal. The movable member 53 may be displaced (expanded/contracted) by the same amount regardless of a position thereof. Alternatively, the movable member 53 may be displaced only at some predetermined points (two points, three points, and the like), and in this case, due to a positional variation, not only the longitudinal displacement of the movable mirror 50 but also a tilt angle may be finely adjusted.

Referring to a cross-sectional view of the PBS assembly 220' shown in FIG. 20C, openings 226a, 226b, 226c, and 226d, through which light may pass, are provided in upper, lower, left, and right sides of the polarization beam splitter 225, respectively. In addition, a transflective plate 227 disposed at an angle of 45° is provided diagonally across the inside of the polarization beam splitter 225. The transflective plate 227 may be implemented in the form of a half mirror in which a portion of the incident light is transmitted and a portion thereof is reflected when the light is incident in a horizontal or vertical direction through the opening.

The fixed mirror 60 is fixedly disposed on a right side surface of the polarization beam splitter 225, and a right opening 226d is aligned with a reflective surface 61 that is installed inside the fixed mirror 60.

Further, the opening 226a formed in the upper surface of the polarization beam splitter 225 is linearly aligned with a hollow portion 58 formed in the fixed member 57 of the piezo stage 55, a hollow portion 54 formed in the movable member 53 of the piezo stage 55, and a reflective surface 51 of the movable mirror 50. Accordingly, although the movable mirror 50 is movable in a longitudinal direction together with the movable member 53, there is no obstacle in a path of light entering/exiting from the reflective surface 51.

Due to such an operation of the movable member 53, when the movable mirror 50 operates, a spectropolarimetric optical path difference generated between light reflected by the movable mirror 50 and light reflected by the fixed mirror 60 varies. According to one embodiment of the present invention, a magnitude of the optical path difference for maximizing the strength of the signal and a displacement value of the movable mirror 50 for this magnitude may be automatically determined, and the movable mirror 50 may be automatically controlled with the determined displacement value.

Figure 21:
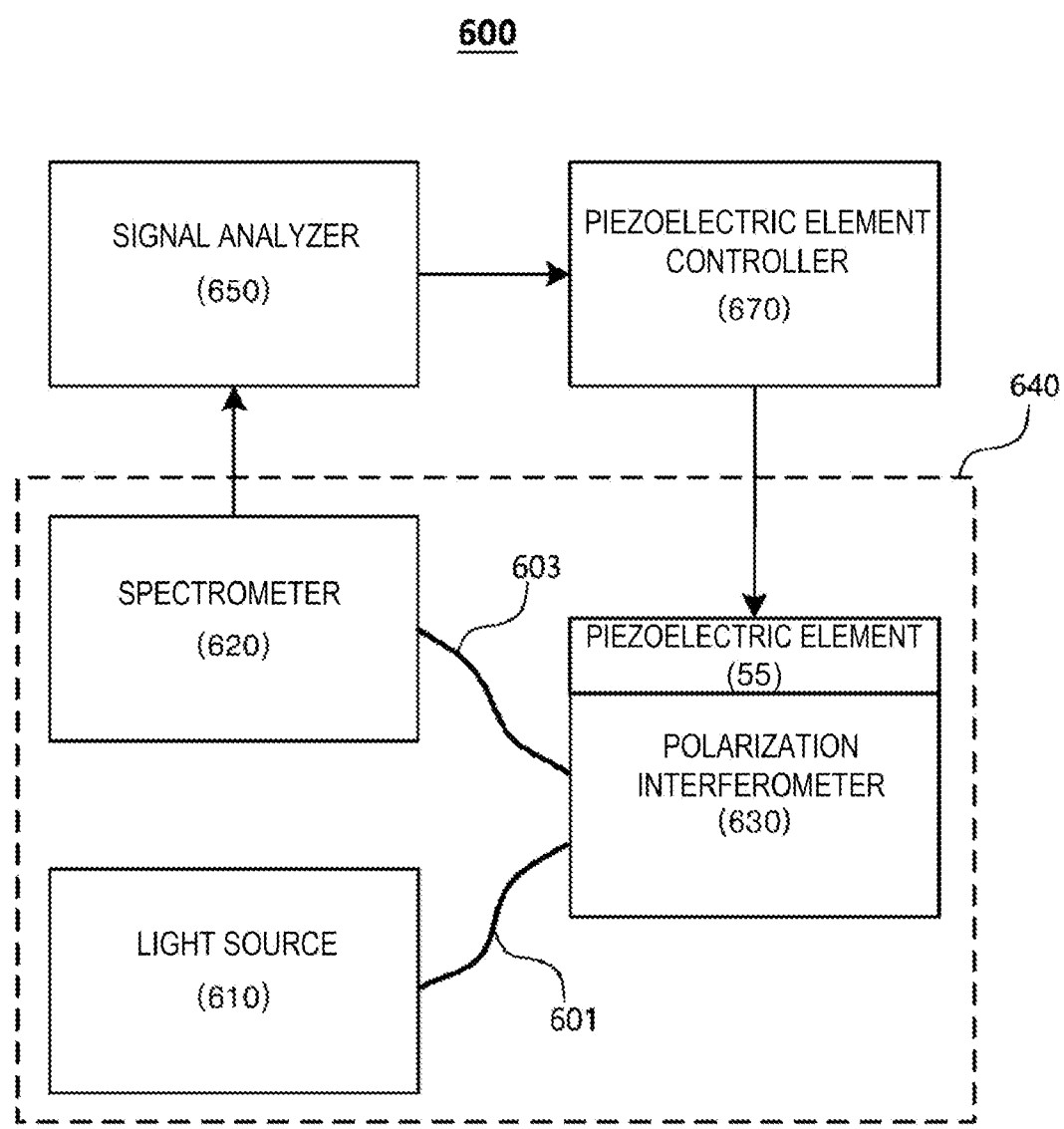
FIG. 21 is a block diagram of an optical path difference automatic adjustment apparatus of the spectropolarimetric apparatus according to one embodiment of the present invention.

FIG. 21 is a block diagram of an optical path difference automatic adjustment apparatus 600 of the spectropolarimetric apparatus according to one embodiment of the present invention. The apparatus 600 includes a light source 610 configured to light, a polarization interferometer 630 configured to split the emitted light into a plurality of polarized light beams using a polarization beam splitter 225, and transmit or reflect at least some of the split polarized light beams to a target sample to output the obtained light, and a spectrometer 620 configured to analyze the output light to measure physical properties of the target sample.

Here, the polarization interferometer 630 includes a light input terminal 601 to which the light irradiated from the light source 610 is incident, the polarization beam splitter 225 configured to split the incident light, a first mirror 50 installed on a first surface of the polarization beam splitter 225 and configured to reflect first polarized light transmitted through the polarization beam splitter 225 to the polarization beam splitter 225, a second mirror 60 attached to a second surface of the polarization beam splitter 225, which is perpendicular to the first surface, and configured to reflect second polarized light reflected by the polarization beam splitter 225 to the polarization beam splitter 225, and a light output terminal 603 from which light obtained by a complex wave, which is generated by combining the first polarized light and the second polarized light and transmitted to or reflected by the target sample, is emitted to the spectrometer 620.

The optical path difference automatic adjustment apparatus 600 of the spectropolarimetric apparatus further includes a signal analyzer 650 configured to calculate a signal intensity of the analyzed light, a piezoelectric element 55, which is installed on one side of the polarization interferometer and whose displacement is changed according to an electrical signal, and a piezoelectric element controller 670 configured to determine a displacement amount of the piezoelectric element 55 on the basis of the calculated signal intensity and control the piezoelectric element using the determined displacement amount.

Here, at least one of the first and second mirrors is installed on the piezoelectric element 55 and is operated in a longitudinal direction by as much as the determined displacement amount. For example, the piezoelectric element 55 may be installed in only one of the first and second mirrors and may also be installed in both the first and second mirrors.

The signal analyzer 650 may use a normalized signal of interferogram to calculate the signal intensity of the light. The interferogram means that a change in the intensity of interference light due to the optical path difference is measured and recorded as a function of the optical path difference. The intensity of the interference light may be determined as a function of an optical path difference x that changes and a spectrum of the light incident on the interferometer, and in particular, in the function, a component that varies according to the optical path difference x is referred to as the interferogram.

Figure 22:
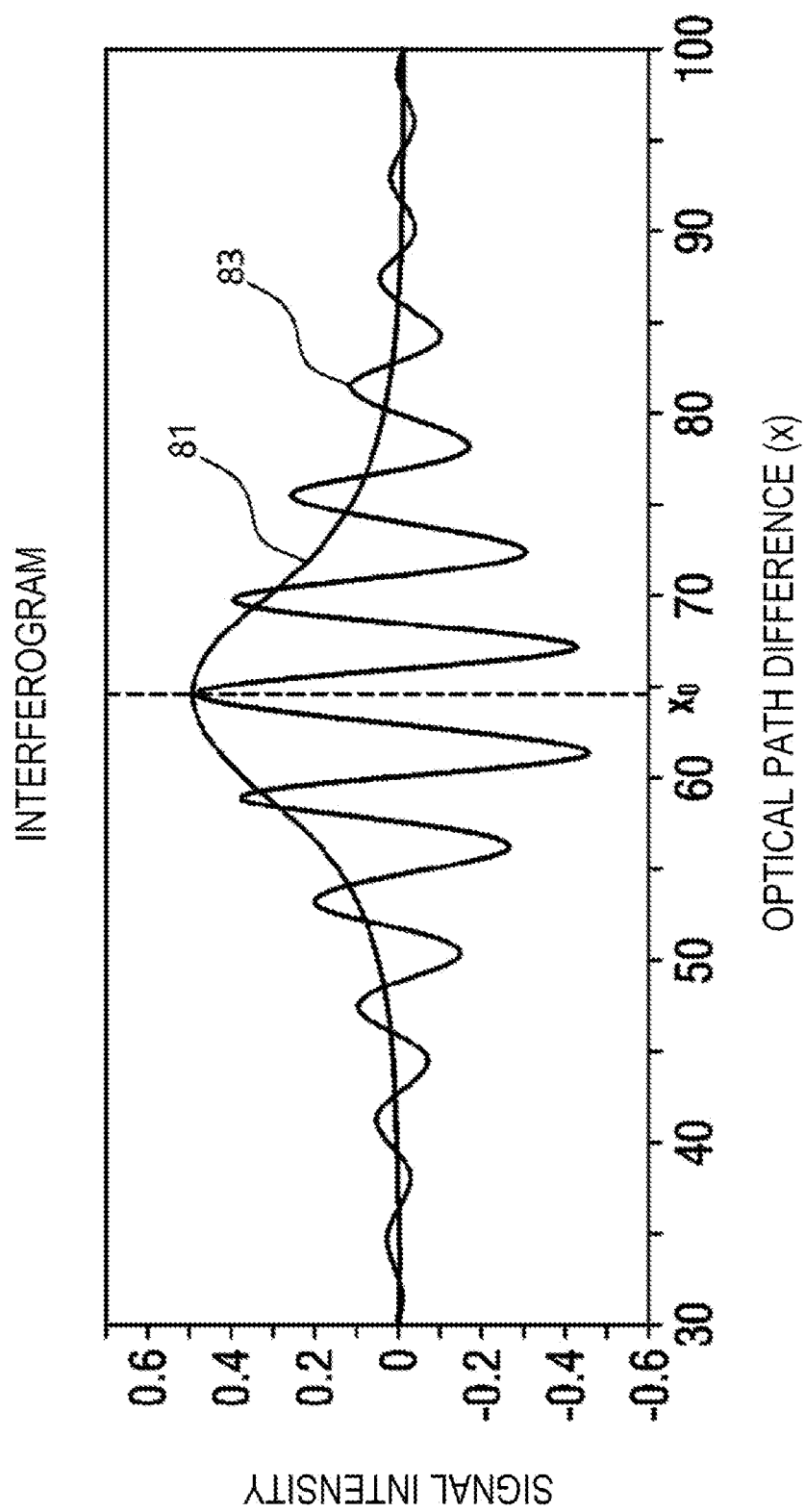
FIG. 22 a graph illustrating an interferogram function according to one embodiment of the present invention.

FIG. 22 is a graph illustrating an example of an interferogram function 83 according to one embodiment of the present invention. The function is varied according to the optical path difference x, and a value at the specific position x may be considered to mean a signal intensity. The interferogram function 83 may also be converted into a normalized function 81 and expressed. When the interferogram function 83 or the normalized function 81 is used, it is possible to calculate an optical path difference x0 at which the signal intensity is maximized.

The piezoelectric element controller 670 determines a displacement amount of the piezoelectric element 55 that represents the calculated optical path difference x0, that is, a displacement amount of the movable mirror 50, and controls the piezoelectric element 55 using the determined displacement amount. In order to operate the piezoelectric element 55 using the displacement amount, a value of voltage actually applied to the piezoelectric element 55 is controlled. However, a correlation between the displacement amount and the voltage value is different depending on the specification of the piezoelectric element 55, and thus the displacement amount may be adjusted with reference to a mapping table indicating the relationship between the displacement amount and the voltage value. The measurement of the signal intensity and the control of the piezoelectric element according to the measurement may be completed in one process, but may be controlled in a feedback manner in which the process is repeated several times until a predetermined precision is secured.

In the above, the embodiment in which the displacement amount in the longitudinal direction (optical axis direction) of the movable mirror 50 is adjusted is described. However, the present invention is not limited thereto, and in addition to the displacement amount of the movable mirror 50 in the longitudinal direction, a tilt control (rotational motion control of the movable mirror 50 with respect to an axis perpendicular to an optical axis) may also be performed together. For example, when a sufficient signal intensity is not obtained only by controlling the displacement amount in the optical axis direction, for example, when the movable mirror 50 is slightly tilted with respect to the optical axis due to a processing error or a temperature/humidity change, the tilt control also needs to be performed.

Figure 23:
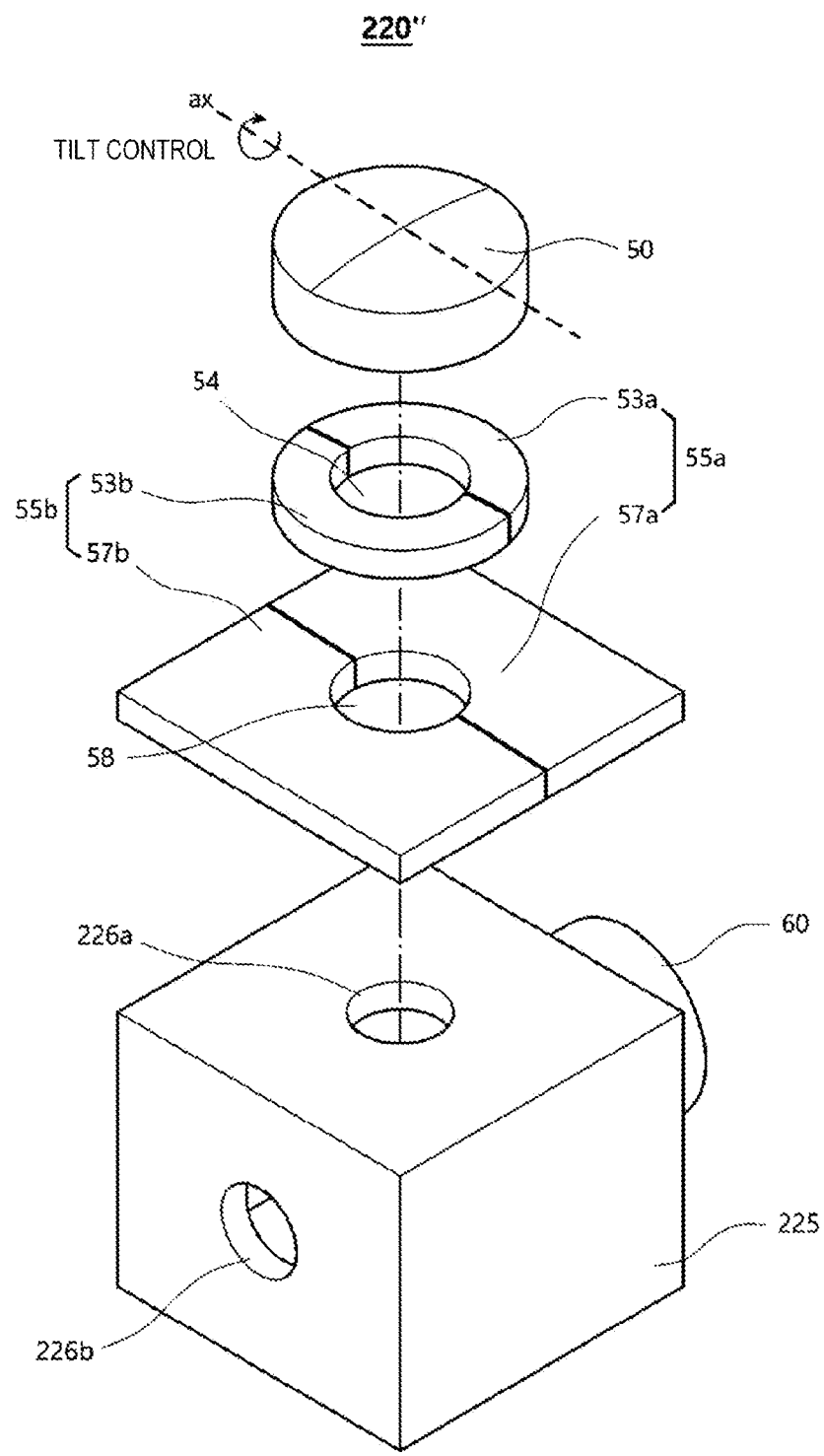
FIG. 23 is a perspective view of a PBS assembly having modified piezo stages for performing longitudinal displacement amount control and tilt control together.

FIG. 23 is a perspective view of a PBS assembly 220" having modified piezo stages 55a and 55b for performing such longitudinal displacement amount control and tilt control together. The PBS assembly 220" has almost the same configuration as the PBS assembly 220' of FIG. 20A, but there is a difference only in that the piezo stages 55a and 55b are composed of two pairs.

The piezo stage includes sub-stages 55a and 55b, each of which is responsible for a plurality of regions, and a movable mirror 50 installed on the piezo stage 55 is tilt-controlled about an axis ax perpendicular to an optical axis through differential control of the sub-stages 55a and 55b.

For example, when a longitudinal displacement of a movable member 53a positioned on a fixed member 57a of a first sub-stage 55a is "h1" and a longitudinal displacement of a movable member 53b positioned on a fixed member 57b of a second sub-stage 55b is "h2," a longitudinal displacement of the movable mirror 50 will be (h1+h2)/2, and a tilt angle of the movable mirror 50 will be arctan(|h1−h2|/d). Here, "d" represents a diameter of the movable mirror 50.

The invention claimed is:

1. A spectropolarimetric apparatus comprising an integrated polarization interferometer that includes:
   a light source configured to emit light;
   a polarization interferometer configured to split the emitted light into a plurality of polarized light beams using a polarization beam splitter and irradiate at least some of the split polarized light beams to a reflective sample to output reflected light; and
   a spectrometer configured to measure physical properties of the reflective sample by analyzing the output light,
   wherein the spectropolarimetric apparatus further comprises an integration assembly configured to accommodate the light source and the spectrometer together,
   the polarization interferometer is accommodated in a housing,
   a light source terminal of the light source and a spectrometer terminal of the spectrometer are exposed on one side surface of the integration assembly, a light input terminal and a light output terminal are exposed on one side surface of the housing, and a connection is established between the light source terminal and the light input terminal and between the spectrometer terminal and the light output terminal when the integration assembly is coupled to the housing,
   a stepped portion is formed in an optical axis direction on the one side surface of the housing, on which the light input terminal and the light output terminal are exposed, so that the light input terminal is present at a position more protruding than that of the light output terminal, and
   a stepped portion is formed in the optical axis direction on the one side surface of the integration assembly, on which the light source terminal and the spectrometer terminal are exposed, so that the spectrometer terminal is present at a position more protruding than that of the light source terminal.

2. The spectropolarimetric apparatus of claim 1, wherein the polarization interferometer includes:
   the light input terminal to which the light irradiated from the light source is incident;
   a first polarization beam splitter configured to split the incident light;
   a first mirror installed on a first surface of the first polarization beam splitter and configured to reflect first polarized light transmitted through the first polarization beam splitter back to the first polarization beam splitter;
   a second mirror attached to a second surface of the first polarization beam splitter, which is perpendicular to the first surface, and configured to reflect second polarized light reflected by the first polarization beam splitter back to the first polarization beam splitter;
   a second polarization beam splitter configured to transmit a complex wave generated by combining the first polarized light and the second polarized light to the reflective sample, receive the light reflected by the reflective sample, and emit the light to the spectrometer; and
   the housing configured to accommodate the light input terminal, the first polarization beam splitter, the second polarization beam splitter, the first mirror, the second mirror, and the light output terminal,
   wherein the second mirror is a fixed mirror fixed to the second surface,
   the first mirror is a movable mirror that is displaceable in a direction perpendicular to the first surface, and
   a difference between a path length of the first polarized light and a path length of the second polarized light is adjustable by the displacement of the first mirror.

3. The spectropolarimetric apparatus of claim 2, wherein an opening is formed on the other side surface of the housing, and
   an operation portion that allows a user to adjust a position of the first mirror is disposed in the opening.

4. The spectropolarimetric apparatus of claim 2, wherein a sample terminal for transmitting the complex wave to the reflective sample and receiving the light reflected by the reflective sample is formed on a side of the housing, which is opposite to the light output terminal.

5. A spectropolarimetric system comprising:
the spectropolarimetric apparatus of claim 1; and
a gantry on which the spectropolarimetric apparatus is mounted such that a sample terminal of the spectropolarimetric apparatus is directed toward the reflective sample.

6. The spectropolarimetric system of claim 5, wherein the reflective sample is a roll-to-roll film-type sample, which is continuously transferred,
the gantry includes transverse supports, each of which extends in a transverse direction perpendicular to a transfer direction of the reflective sample, respectively above and below the reflective sample, wherein the transverse support includes a pair of guide rails parallel to each other and a slot formed to be elongated between the pair of guide rails, and
the spectropolarimetric apparatus is movable in the transverse direction along the slot.

\* \* \* \* \*